US010369728B2

(12) United States Patent
Goshima et al.

(10) Patent No.: US 10,369,728 B2
(45) Date of Patent: Aug. 6, 2019

(54) OPTICAL ELEMENT AND METHOD FOR MANUFACTURING OPTICAL ELEMENT

(71) Applicant: Konica Minolta, Inc., Tokyo (JP)

(72) Inventors: Takehiko Goshima, Kunitachi (JP); Yoshihiro Okumura, Toyohashi (JP); Hiroshi Umetsu, Tachikawa (JP); Seiji Yuasa, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 544 days.

(21) Appl. No.: 14/776,303

(22) PCT Filed: Jan. 15, 2014

(86) PCT No.: PCT/JP2014/050510
§ 371 (c)(1),
(2) Date: Sep. 14, 2015

(87) PCT Pub. No.: WO2014/148072
PCT Pub. Date: Sep. 25, 2014

(65) Prior Publication Data
US 2016/0039130 A1 Feb. 11, 2016

(30) Foreign Application Priority Data
Mar. 21, 2013 (JP) .................... 2013-058838

(51) Int. Cl.
B29D 11/00 (2006.01)
B29C 45/00 (2006.01)
(Continued)

(52) U.S. Cl.
CPC ........ B29C 45/0025 (2013.01); B29C 45/372 (2013.01); B29D 11/00644 (2013.01);
(Continued)

(58) Field of Classification Search
CPC .............. B29C 45/0025; B29C 45/372; B29C 45/2756; B29D 11/00644; G02B 3/00; G02B 1/04
See application file for complete search history.

(56) References Cited

U.S. PATENT DOCUMENTS

2012/0013964 A1 1/2012 Ohhashi et al.
2013/0301274 A1* 11/2013 Anderson ............. F21V 29/505
362/294

FOREIGN PATENT DOCUMENTS

JP 03-128218 A 5/1991
JP 03-281213 * 12/1991
(Continued)

OTHER PUBLICATIONS

International Search Report dated Apr. 8, 2014 for PCT/JP2014/050510 and English translation thereof.

Primary Examiner — Mathieu D Vargot
(74) Attorney, Agent, or Firm — Lucas & Mercanti, LLP

(57) ABSTRACT

To provide a method for manufacturing an optical element, which improves the surface precision of the optical surface as well as reducing the birefringence at a low cost. A method for manufacturing an optical element 1090A having optical surfaces 1091 and 1092 and a non-optical surface 1093A that is adjacent to the optical surface 1092 via a ridge by injection molding includes forming the non-optical surface 1093A with a mold surface. The mold surface includes a sink forming area 1095 as a first area having a first surface roughness, and a high transfer area 1094 as a second area having a second surface roughness different from the first surface roughness. The second area is located outside the first area.

14 Claims, 23 Drawing Sheets

(51) Int. Cl.
*G02B 3/00* (2006.01)
*B29C 45/37* (2006.01)
*G02B 1/04* (2006.01)
B29C 45/27 (2006.01)
B29L 11/00 (2006.01)
B29K 101/12 (2006.01)

(52) U.S. Cl.
CPC ............... *G02B 1/04* (2013.01); *G02B 3/00* (2013.01); *B29C 45/2756* (2013.01); *B29K 2101/12* (2013.01); *B29K 2995/0013* (2013.01); *B29K 2995/0072* (2013.01); *B29L 2011/00* (2013.01)

(56) References Cited

FOREIGN PATENT DOCUMENTS

| JP | 06-328522 A | 11/1994 |
|----|-------------|---------|
| JP | 2012020511 A | 2/2012 |
| JP | 2012056269 A | 3/2012 |
| JP | 2012250510 A | 12/2012 |

* cited by examiner

FIG. 3

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| STRUCTURE OF NON-OPTICAL SURFACE OF MOLD | NON-OPTICAL SURFACE AREA SECTION (A: SINK FORMING AREA / B: HIGH TRANSFER AREA) | A | A | A | A | A | A |
| | MATERIAL OF SURFACE LAYER (THICKNESS DESCRIBED WHEN LAYERED) (THERMAL CONDUCTIVITY W/m·K) | STAVAX (20) | Ni-P PLATING (t: 20μ) + CERAMIC LAYER (t: 1mm) (8) | Ni-P PLATING (t: 500μ) (8) | HEAT RESISTANT RESIN FILM HEAT RESISTANT RESIN COATING (t: 30μ) (0.6) | STAVAX (20) | CERAMIC BONDING LAYER (t: 1mm) (3) |
| | SURFACE TREATMENT (SURFACE ROUGHNESS Ra μm) | MIRROR SURFACE-EPCO TREATMENT (~0.2) | MIRROR SURFACE-EPCO TREATMENT (~0.2) | MIRROR SURFACE-EPCO TREATMENT (~0.2) | MIRROR SURFACE-EPCO TREATMENT (~0.2) | MIRROR SURFACE-EPCO TREATMENT (~0.2) | MIRROR SURFACE-EPCO TREATMENT (~0.2) |
| | NON-OPTICAL SURFACE AREA SECTION (A: SINK / B: HIGH TRANSFER) | B | B | | | | |
| | MATERIAL OF SURFACE LAYER | STAVAX (20) | STAVAX (20) | STAVAX (20) | STAVAX (20) | COPPER ALLOY (200) | COPPER ALLOY (200) |
| | SURFACE TREATMENT | MIRROR SURFACE TREATMENT (~0.05) | MIRROR SURFACE TREATMENT (~0.05) | MIRROR SURFACE TREATMENT (~0.05) | RESIN SURFACE (0.07) | MIRROR SURFACE-EPCO TREATMENT (~0.2) | MIRROR SURFACE-EPCO TREATMENT (~0.2) |
| | | GRAINING (0.7-) | GRAINING (0.7-) | GRAINING (0.7-) | GRAINING (0.7-) | GRAINING (0.7-) | |
| | DIMENSION (ADJACENT OPTICAL SURFACE DISTANCE mm) | 3 | 3 | 3 | 3 | 3 | 3 |
| | | 2 | 2 | 2 | 2 | 2 | 2 |
| | | B (ONE SIDE) | | | | | |
| | EVALUATION CRITERIA | | | | | | |
| EVALUATION OF MOLDED ARTICLE | BIREFRINGENCE DISTRIBUTION (POLARIZATION DEGREE OF 3/4 SURFACE OF PRISM IS LESS THAN 4% / 3/4 AT CENTER OF INCIDENT/OUTPUT SURFACE OF PRISM) | ○ | ○ | ○ | ○ | ○ | ○ |
| | OPTICAL SURFACE PRECISION FIXED OPTICAL SURFACE (D) / NO APPEARANCE OF SINK MARKS | ○ | ○ | ○ | ○ | ○ | ○ |
| | OPTICAL SURFACE ADJACENT TO B (C) / NO SURFACE DIVISION IN EVALUATION OF INTERFERENCE FRINGE BY WHITE LIGHT INTERFEROMETER | ○ | ○ | ○ | ○ | ○ | ○ |
| | TOTAL EVALUATION / ATTAINMENT OF BOTH BIREFRINGENCE AND SURFACE PRECISION | ○ | ○ | ○ | ○ | ○ | ○ |

FIG. 10

| | | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| STRUCTURE OF NON-OPTICAL SURFACE OF MOLD | MATERIAL OF SURFACE LAYER (THICKNESS DESCRIBED WHEN LAYERED) (THERMAL CONDUCTIVITY W/m·K) | NON-OPTICAL SURFACE AREA SECTION (A: SINK FORMING AREA, B: HIGH TRANSFER AREA) A | STAVAX (20) | STAVAX (20) | Ni-P PLATING (t: 500 μ) (8) | CERAMIC (3) | STAVAX (20) |
| | | B | | | | | |
| | SURFACE TREATMENT (SURFACE ROUGHNESS Ra μm) | A | MIRROR SURFACE - IEPCO TREATMENT (-0.2) | GRAINING (0.7 -) | IEPCO TREATMENT (0.5) | NON TREATMENT (0.6) | MIRROR SURFACE TREATMENT (-0.05) |
| | | B | | | | | IEPCO TREATMENT (0.2) |
| | DIMENSION (ADJACENT OPTICAL SURFACE DISTANCE mm) | A | 7 | 7 | 7 | | 3 |
| | | B (ONE SIDE) | | | | | 2 |
| EVALUATION OF MOLDED ARTICLE | | EVALUATION CRITERIA | | | | | |
| | BIREFRINGENCE DISTRIBUTION | P POLARIZATION RATIO 93% OR HIGHER PV LESS THAN 4% IN ±5mm OF CENTER OF INCIDENT (OUTPUT) SURFACE OF PRISM | ○ | × (PV: NOT LESS THAN 4%) | ○ | × (PV: NOT LESS THAN 4%) | ○ |
| | OPTICAL SURFACE PRECISION FIXED OPTICAL SURFACE (D) | NO APPEARANCE OF SINK MARK | ○ | × (SINK MARK) | ○ | ○ | ○ |
| | OPTICAL SURFACE ADJACENT TO B (C) | NO SURFACE DIVISION IN EVALUATION OF INTERFERENCE FRINGE BY WHITE LIGHT INTERFEROMETER | × (SURFACE DIVISION) | × (SURFACE DIVISION) | × (SURFACE DIVISION) | ○ | × (SURFACE DIVISION) |
| | TOTAL EVALUATION | ATTAINMENT OF BOTH BIREFRINGENCE AND SURFACE PRECISION | × | × | × | × | × |

FIG. 11

| | HIGH TRANSFER AREA WIDTH (ONE SIDE) | SINK AREA WIDTH | RATIO TO DISTANCE TO ADJACENT OPTICAL SURFACE | SURFACE PRECISION OF OPTICAL SURFACE C | SURFACE PRECISION OF OPTICAL SURFACE D |
|---|---|---|---|---|---|
| \multicolumn{6}{l}{RELATIONSHIP BETWEEN HIGH TRANSFER AREA WIDTH AND OPTICAL SURFACE PRECISION IN DISTANCE (7 mm) BETWEEN ADJACENT OPTICAL SURFACES} | | | | | |
| 1 | 0.8mm | 5.4mm | 0.8mm/(7−0.8)mm×100=13(%) | × (SURFACE DIVISION) | ○ |
| 2 | 1mm | 5mm | 1mm/(7−1)mm×100=17(%) | ○ | ○ |
| 3 | 2mm | 3mm | 2mm/(7−2)mm×100=40(%) | ○ | ○ |
| 4 | 2.5mm | 2mm | 2.5mm/(7−2.5)mm×100=56(%) | ○ | ○ |
| 5 | 2.7mm | 1.6mm | 2.7mm/(2−2.7)mm= 63% | | ○ |
| 6 | 3mm | 1mm | 3mm/(7−3)mm×100=75(%) | × (SURFACE DIVISION) | × (SINK MARK) |

FIG. 20

| | EVALUATION CONTENTS | FIG. 15 OPTICAL ELEMENT | FIG. 16 OPTICAL ELEMENT | FIG. 17 LONG LENS | FIG. 18 IMAGING LENS | FIG. 19 LIGHT GUIDE PLATE |
|---|---|---|---|---|---|---|
| OPTICAL SURFACE ADJACENT SURFACE | NO APPEARANCE OF SINK MARK | ◯ | ◯ | ◯ | ◯ | ◯ |
| | NO SURFACE DIVISION IN EVALUATION OF INTERFERENCE FRINGE BY WHITE LIGHT INTERFEROMETER | ◯ | ◯ | ◯ | ◯ | ◯ |
| OPTICAL SURFACE NOT ADJACENT TO SINK FORMING AREA | NO APPEARANCE OF SINK MARK | ◯ | ◯ | ◯ | ◯ | ◯ |
| | ATTAINMENT OF BOTH BIREFRINGENCE AND SURFACE PRECISION | ◯ | ◯ | ◯ | ◯ | ◯ |

OPTICAL ELEMENT AND METHOD FOR MANUFACTURING OPTICAL ELEMENT

CROSS REFERENCE TO RELATED APPLICATION

This Application is a 371 of PCT/JP2014/050510 filed on Jan. 15, 2014 which, in turn, claimed the priority of Japanese Patent Application No. JP2013-058838 filed on Mar. 21, 2013, both applications are incorporated herein by reference.

TECHNICAL FIELD

The present invention relates to an optical element obtained by injecting a resin into a cavity for molding and a method for manufacturing the optical element.

BACKGROUND ART

In recent years, optical elements such as lenses and prisms are required to be thinner and support various uses, and need to be precisely and uniformly molded into a unique shape. Particularly, high uniformity is required with respect to the optical surface shape precision and the inner birefringence. In addition, product lines, which are conventionally made of glass in a mainstream, are required to change into plastic optical elements (plastic lenses, plastic mirrors, etc.) to meet the requirements of cost reduction.

To precisely mold a plastic optical element into a desired shape by injection molding, in the process of filling a mold cavity with molten resin, uniform resin pressure and resin temperature are desired in the cavity to uniformly spread the resin in the mold. Further, the resin pressure needs to be kept being applied until the resin is fully solidified. Besides, regarding molded products in a complex shape with an uneven thickness, the speed of cooling solidification varies depending on the part, which results in the occurrence of internal stress. It is known that a molding method as described above is used to obtain a plastic optical element with accuracy by injection molding. Although improving the shape transfer performance for a resin mold surface, this method allows easy generation of birefringence due to the pressure-holding process and the internal strain.

Meanwhile, to reduce the birefringence, injection molding has to be performed with low resin pressure in the cavity (low-pressure injection molding). However, in the low-pressure injection molding, it is not possible to compensate for the volume of cooling shrinkage of resin filled in the mold. Accordingly, sink marks are likely to occur anywhere including molded articles, and the increase in the amount of shrinkage causes the optical surface to be obtained to separate from the mold transfer surface prior to being fully cured, resulting in deterioration in the performance of molding and transfer of the optical surface shape. Hereinafter, this minute transfer failure of the optical surface is defined and referred to as "surface division" to be distinguished from a general sink mark that can be evaluated from the external appearance. The surface division is explained below based on photographs of interference fringes (see FIGS. 14A, 14B) obtained by a laser interferometer. Comparing the interference fringes regarding the presence of a surface division, if there is a surface division (see FIG. 14B), it can be clearly seen that a boundary is generated due to the difference in transfer condition in the optical surface, and accordingly the surface is divided. FIG. 14A illustrates interference fringes when there is no surface division. As illustrated in FIG. 14A, if there is no surface division, a boundary is not caused by the difference in transfer condition in the optical surface, and thus no surface division occurs. Here, the "surface division" is defined as a minute transfer failure of the optical surface at a level where the presence or absence of the failure can be determined by interference fringes. FIG. 14C is a diagram illustrating shapes of central cross-sections in parallel to the longitudinal direction of photographs obtained by analyzing the interference fringes illustrated in FIGS. 14A and 14B. The solid line indicates a cross-section of FIG. 14A and is seen to form a continuous and loose concave of the optical surface. The dotted line indicates a cross-section of FIG. 14B, and it can be seen that a surface division occurs on the optical surface at a part where the line is discontinuous.

There has been known a plastic mold article molded by low pressure injection molding as a technology for reducing the birefringence of an optical element obtained by injection molding as small as possible, and also improving the necessary accuracy in the molding transfer of the optical surface. The plastic article includes a rib (projection) arranged in a boundary between a non-optical surface and an optical surface, an incomplete transfer face having a concave shape, which is arranged on the same face as where the rib is located and formed by incomplete transfer of the shape of a cavity of the mold, and an incomplete transfer face having a convex shape arranged at least one face other than the transfer face (see Patent Document 1). According to the above technology, sink area has less influence on the surface precision of the optical surface. Therefore, it is possible to improve the shape precision of the transfer surface without causing shrinkage and a surface division on the transfer surface.

PRIOR ART DOCUMENT

Patent Document

[Patent Document 1] Japanese Unexamined Patent Application Publication No. 2012-20511

SUMMARY OF THE INVENTION

Problems to be Solved by the Invention

However, the above conventional technology additionally requires a step of providing a rib in the boundary between the non-optical surface and the optical surface to reduce the influence of the sink area on the surface precision of the optical surface in the manufacturing process. This complicates the manufacturing process and the shape of the mold and the optical element. Considering current demands for space-saving and downsizing of products, the technology disclosed in Patent Document 1 is not applicable to an optical element having space limitations. Further, even if the rib is made smaller to meet the space limitations, if the rib is located adjacent to the optical surface to be obtained, the rib cannot completely control a large amount of shrinkage. This result in sink marks and a surface division on the optical surface. Generally, the amount of shrinkage is random with a certain width, and therefore, the unnecessary rib is inevitably increased in size.

It is, therefore, an object of the present invention to achieve an optical element with small birefringence, which is superior in the necessary precision of shape transfer of the optical surface, by a simple method that does not require an unwanted rib as well as a mold having a complex structure and a complicated molding method.

Means of Solving the Problems

To solve at least one of the above problems, a method for manufacturing an optical element according to one aspect of the present invention is a method for manufacturing an optical element having an optical surface and a non-optical surface that is adjacent to the optical surface via a ridge by injection molding that includes a step of forming the non-optical surface with a mold having a surface that includes a first area having a first surface roughness for forming a sink area, and a second area having a second surface roughness larger than the first surface roughness, which is located between the first area and the optical surface.

Further, to solve at least one of the above problems, according to an aspect of the present invention, an optical element is manufactured by the above method.

Effects of the Invention

Thus, with the method for manufacturing an optical element according to an aspect of the present invention, it is possible to improve the surface precision of the optical surface as well as reduce the birefringence at a low cost.

BRIEF DESCRIPTION OF THE DRAWINGS

FIG. 3 is a table for explaining the evaluation of birefringence distribution and optical surface precision in examples 1 to 6.

FIG. 10 is a table for explaining the evaluation of birefringence distribution and optical surface precision in Comparative Examples 1 to 5.

FIG. 11 is a table illustrating the relationship between high transfer area width and optical surface precision within the distance between adjacent optical surfaces.

FIG. 20 is a table illustrating the evaluation of the optical surfaces of optical elements illustrated in FIGS. 15 to 19.

MODES FOR CARRYING OUT THE INVENTION

Embodiments of the present invention are described below with reference to the accompanying drawings.

Figure 1:
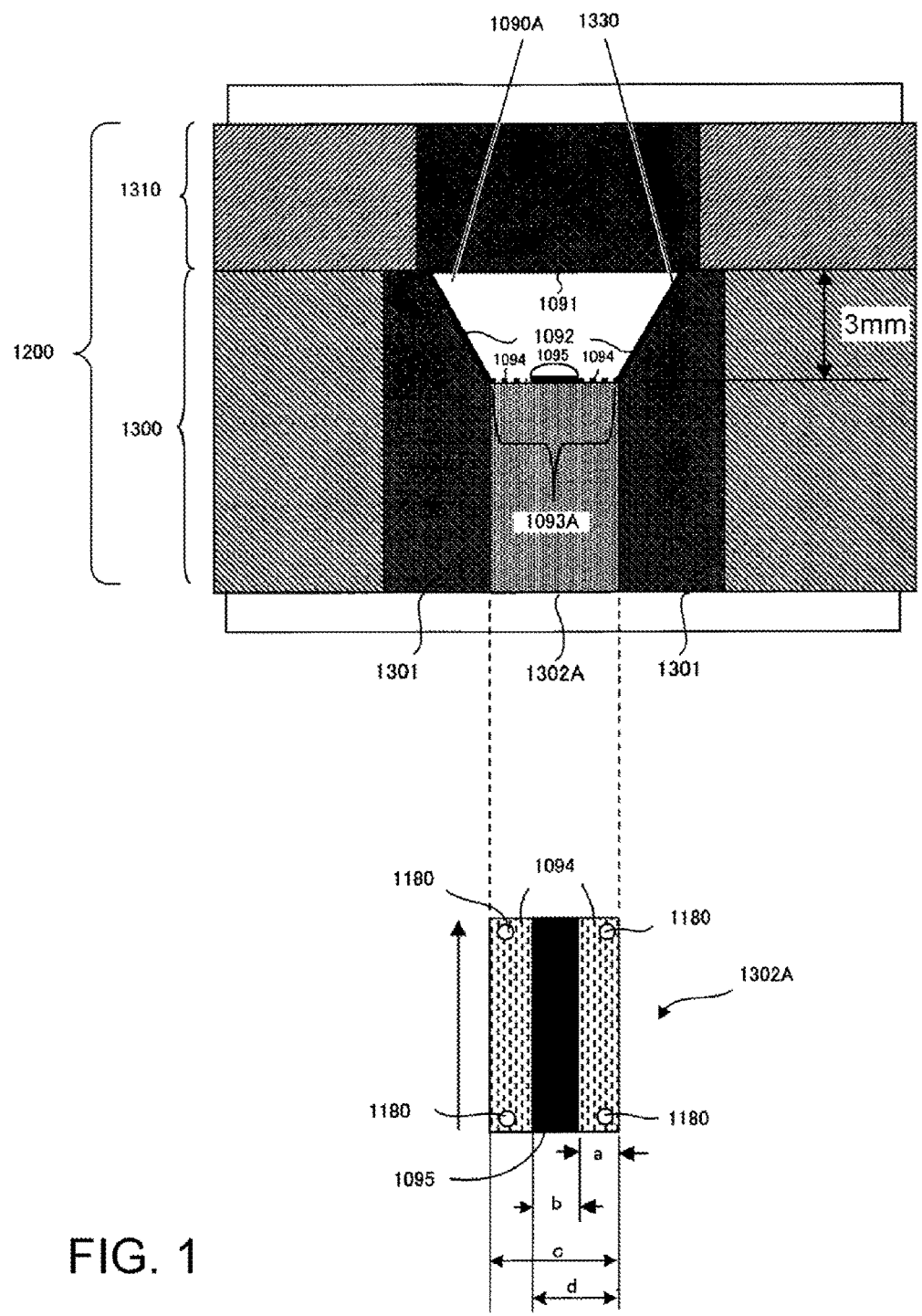
FIG. 1 is a schematic diagram for explaining a method for manufacturing an optical element according to Example 1.
Figure 2A:
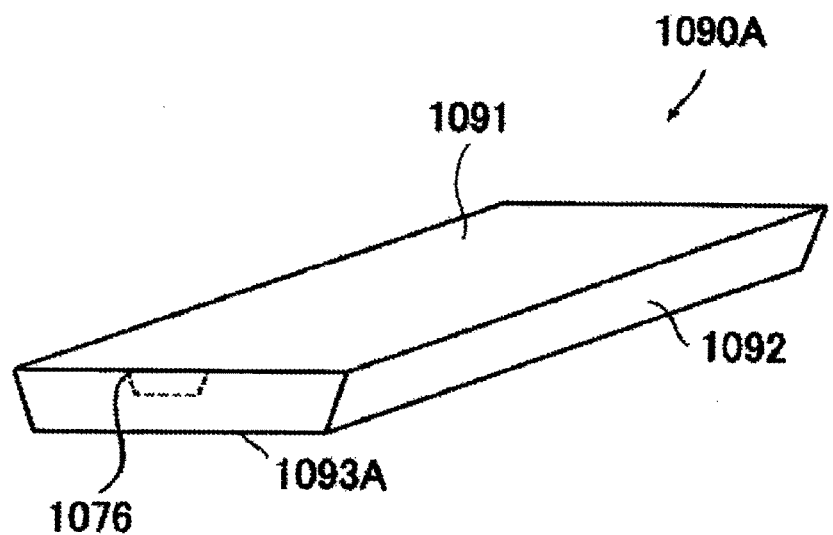
FIG. 2A is an external perspective view of the optical element in the Example 1.
Figure 2B:
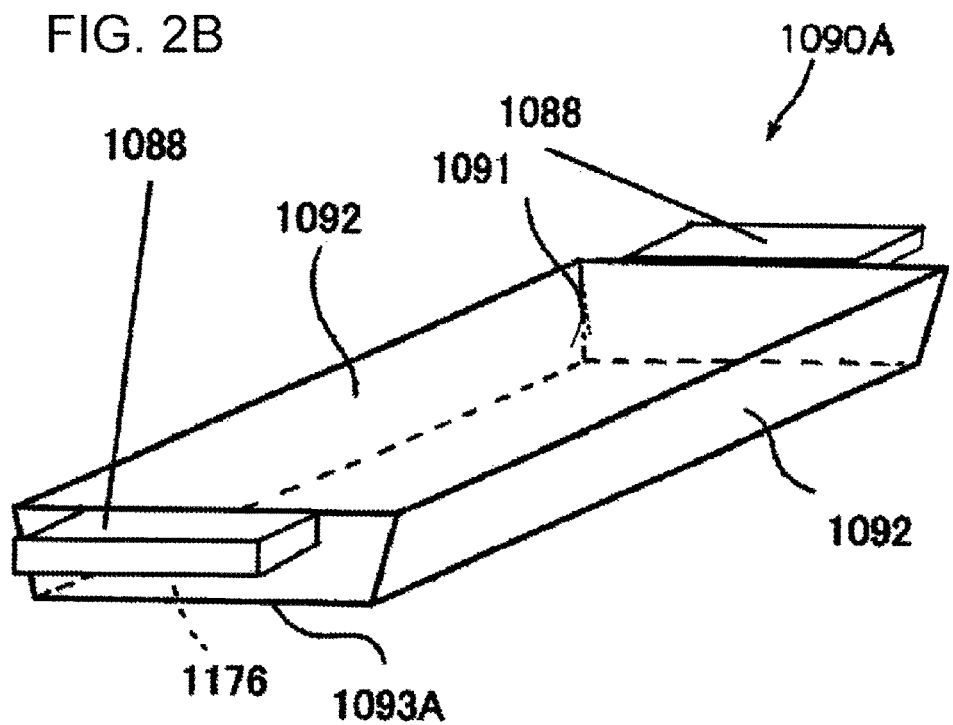
FIG. 2B is an external perspective view of an optical element in another example.
Figure 4:
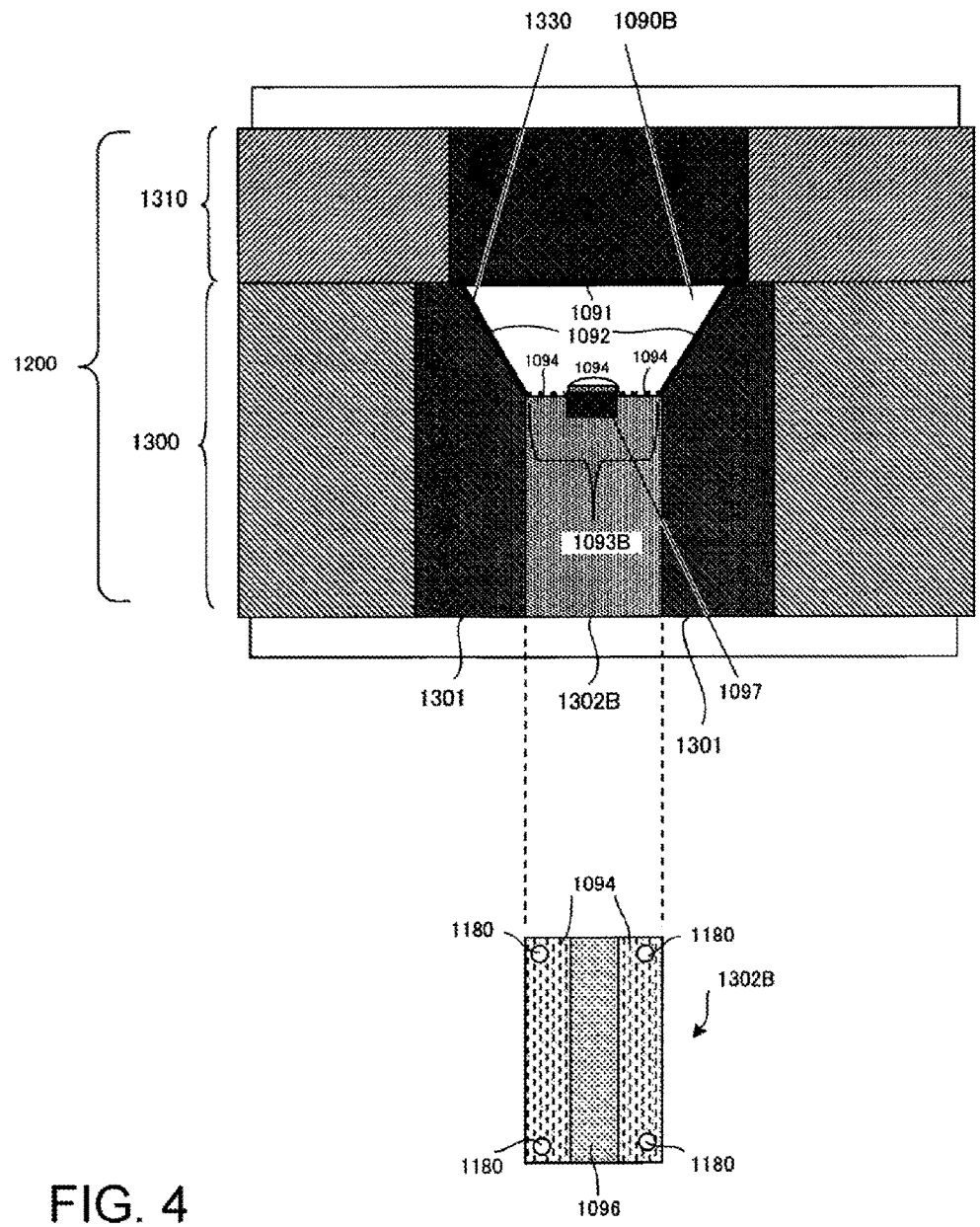
FIG. 4 is a schematic diagram for explaining a method for manufacturing an optical element according to Example 2.
Figure 5:
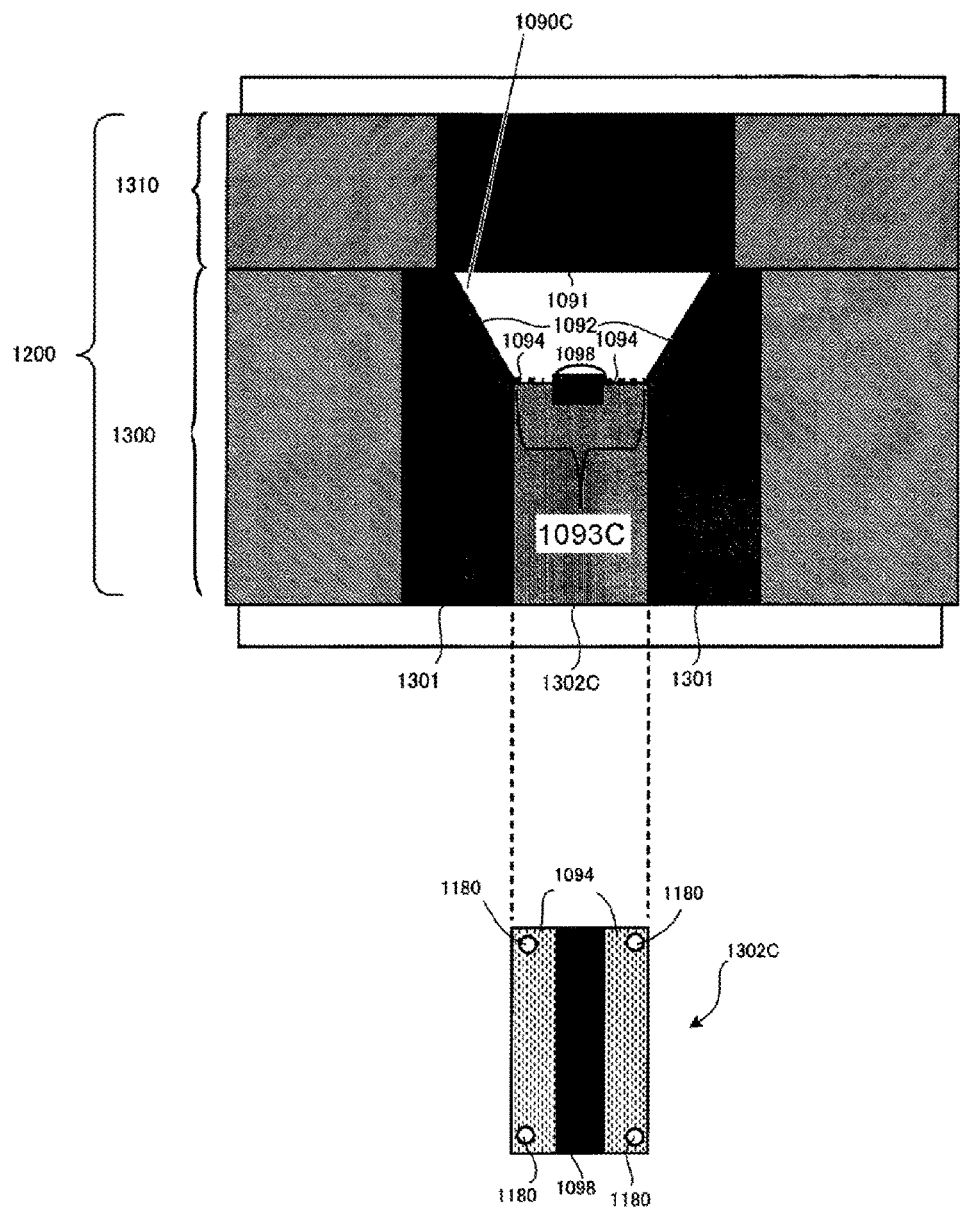
FIG. 5 is a schematic diagram for explaining a method for manufacturing an optical element according to Example 3.
Figure 6:
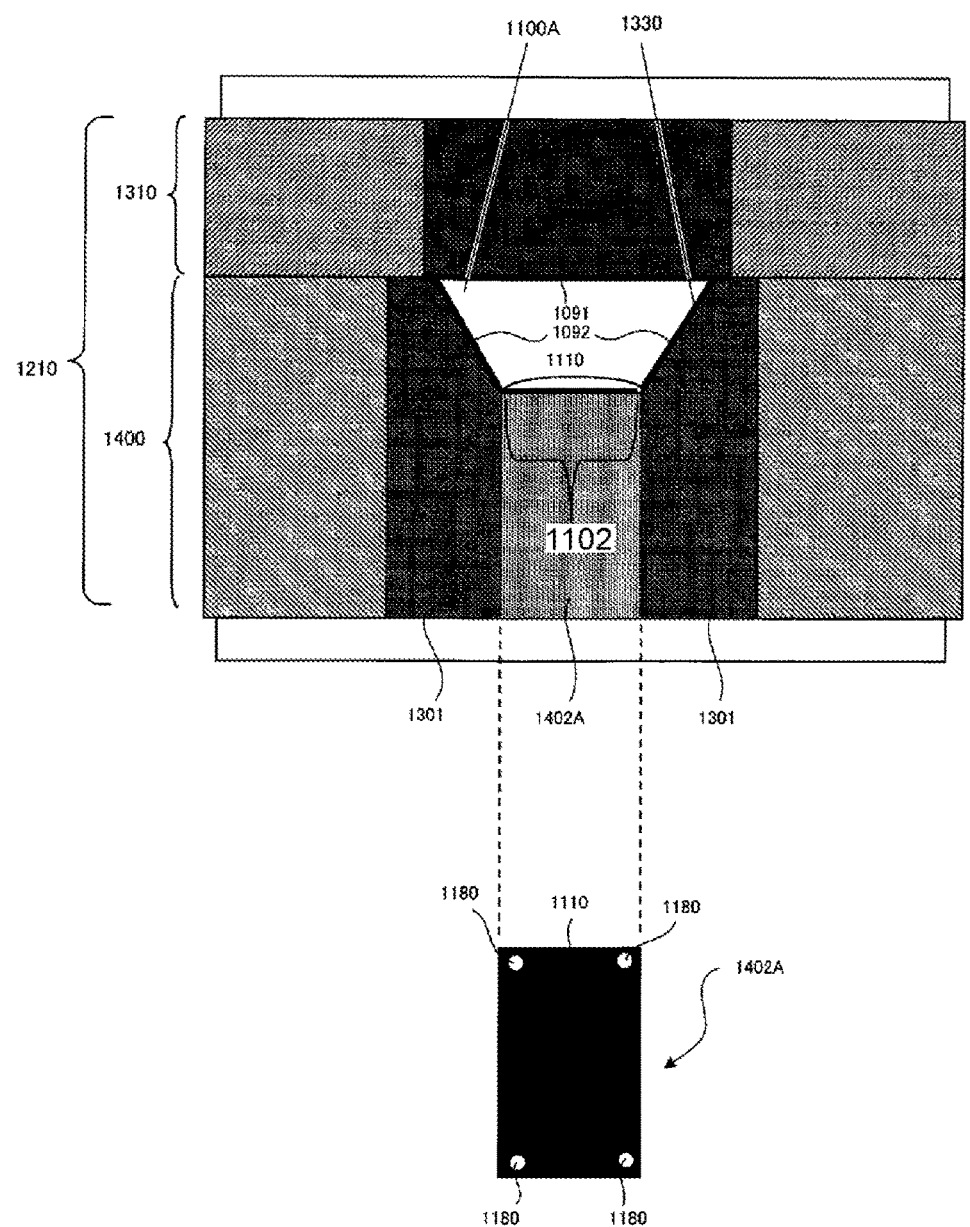
FIG. 6 is a schematic diagram for explaining a method for manufacturing an optical element according to Comparative Example 1.
Figure 7:
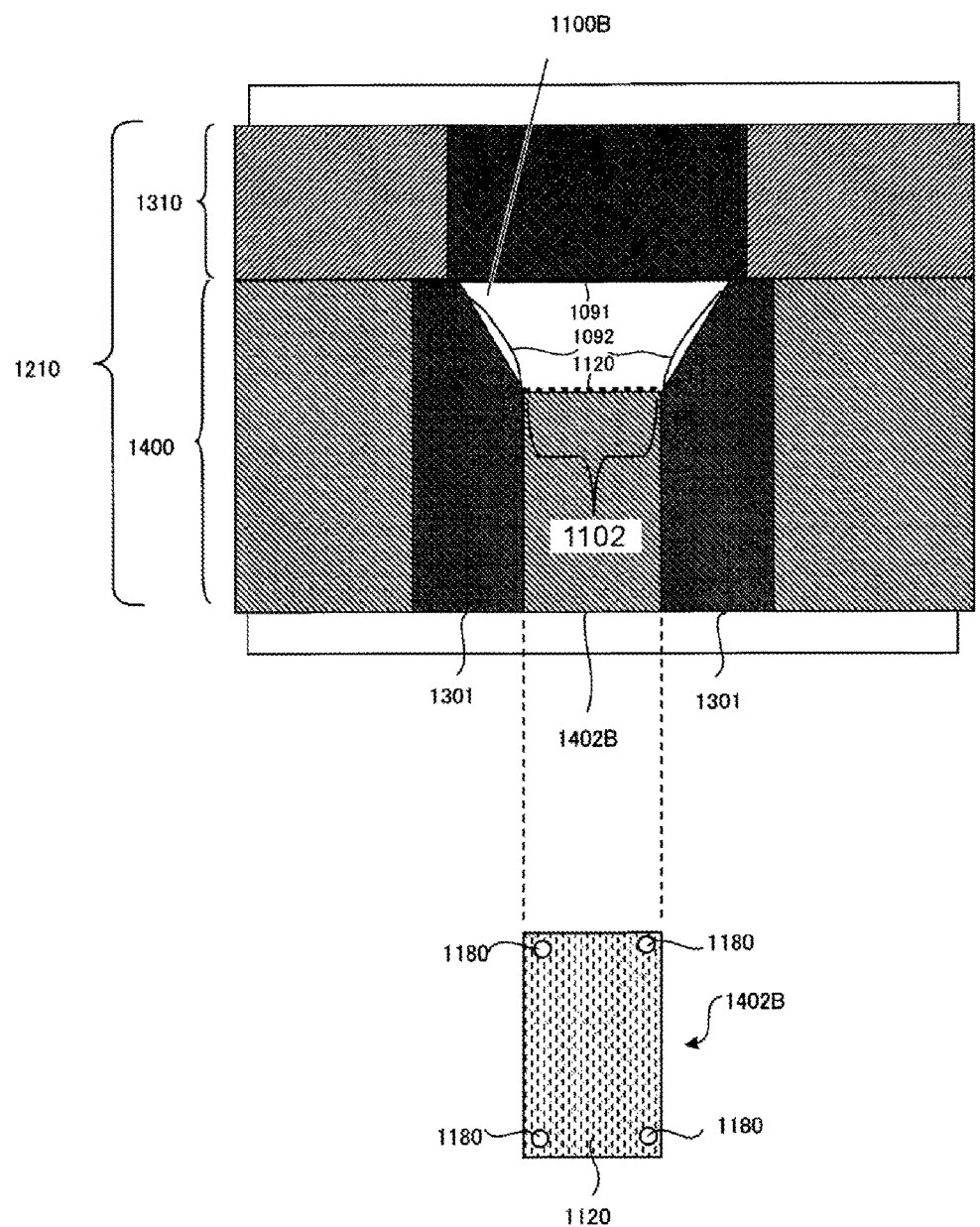
FIG. 7 is a schematic diagram for explaining a method for manufacturing an optical element according to Comparative Example 2.
Figure 8:
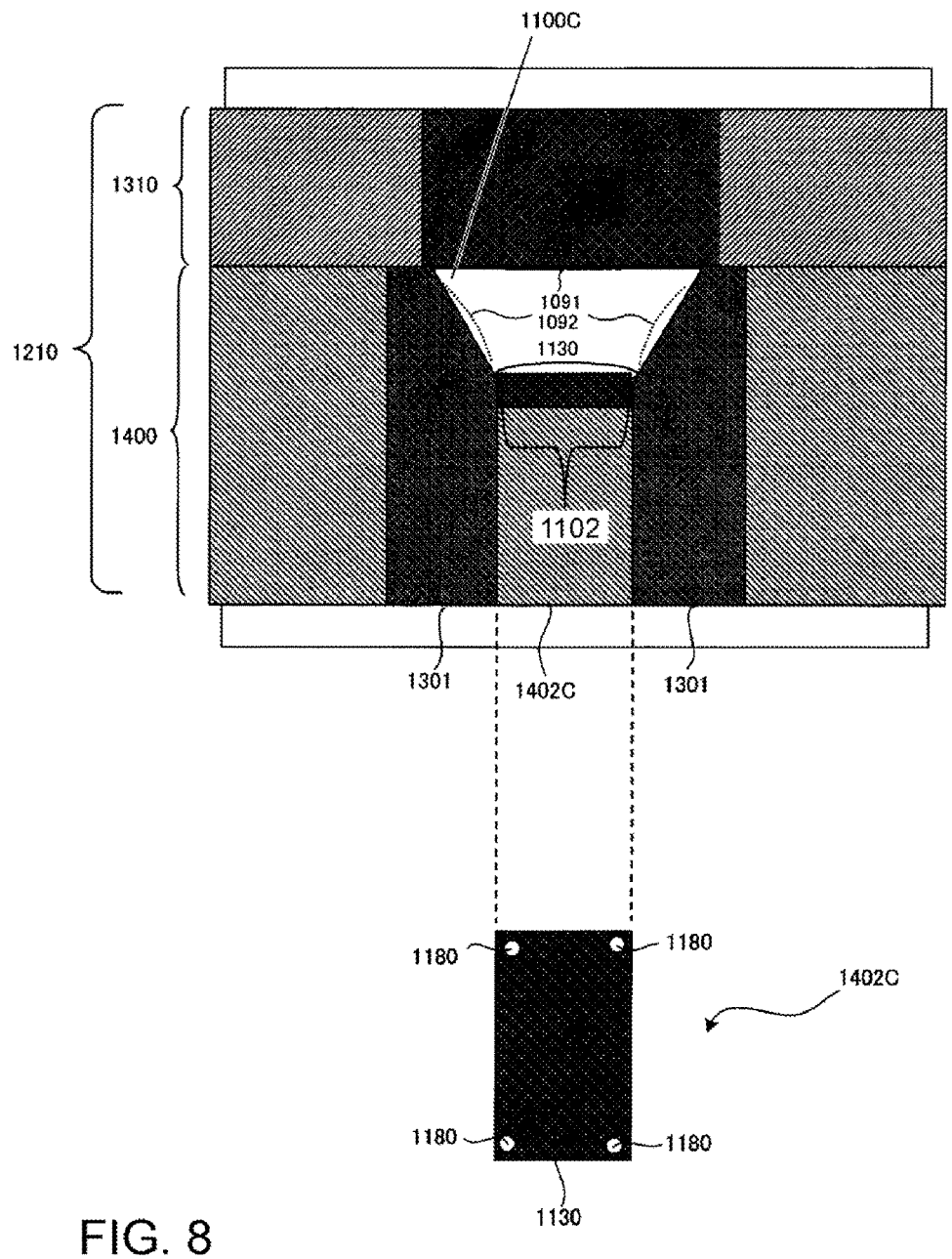
FIG. 8 is a schematic diagram for explaining a method for manufacturing an optical element according to Comparative Example 3.
Figure 9:
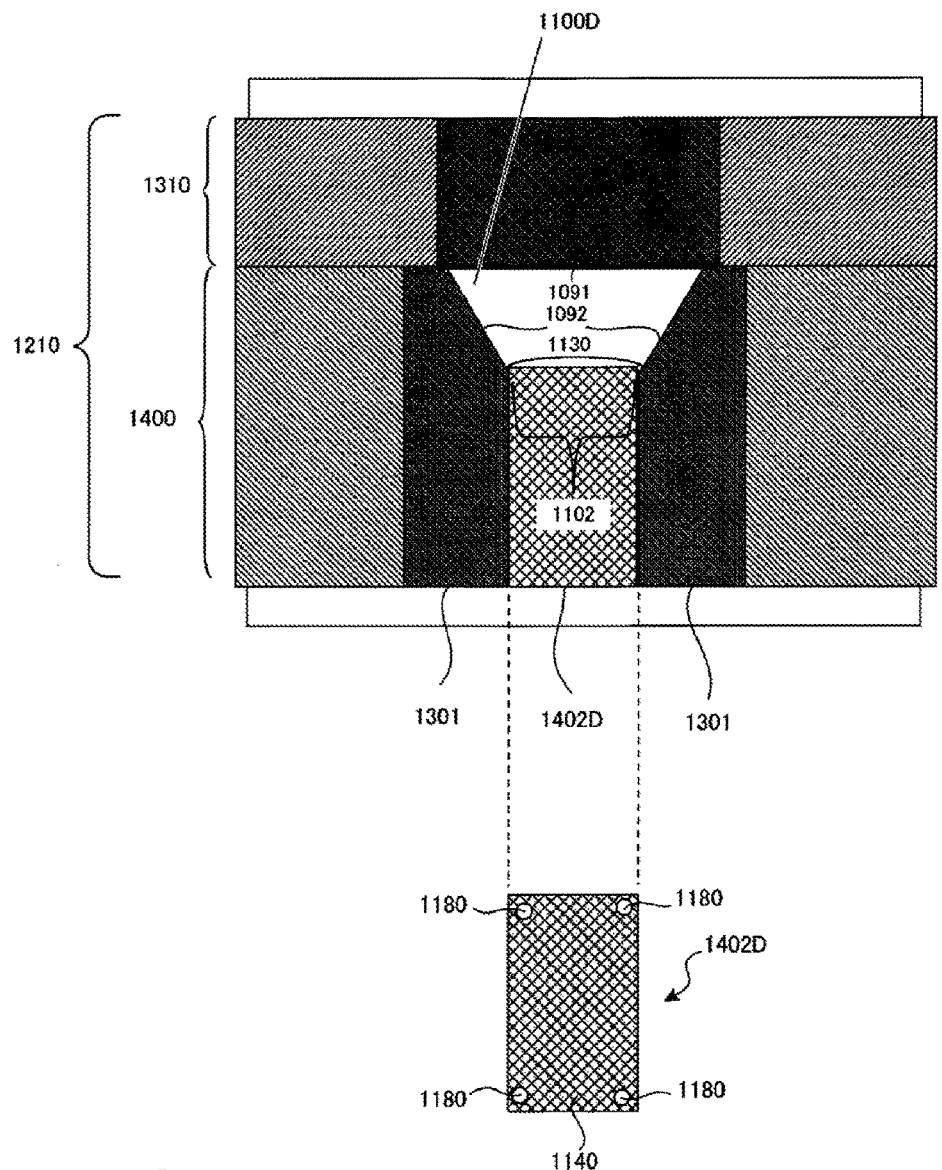
FIG. 9 is a schematic diagram for explaining a method for manufacturing an optical element according to Comparative Example 4.
Figure 12A:
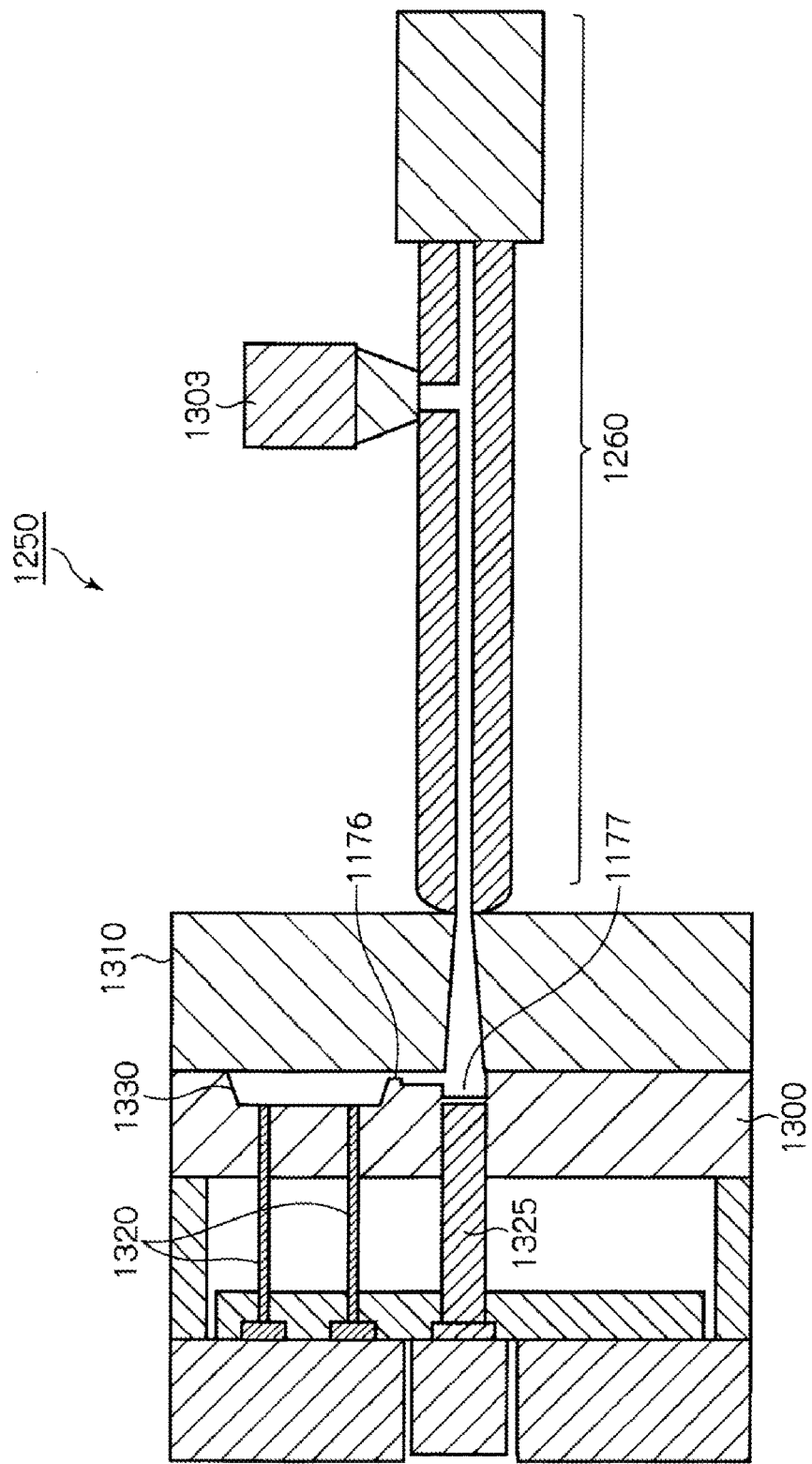
FIG. 12A is a schematic diagram illustrating the process of so-called mold clamping to form a cavity by butting a movable mold against a stationary mold.
Figure 12B:
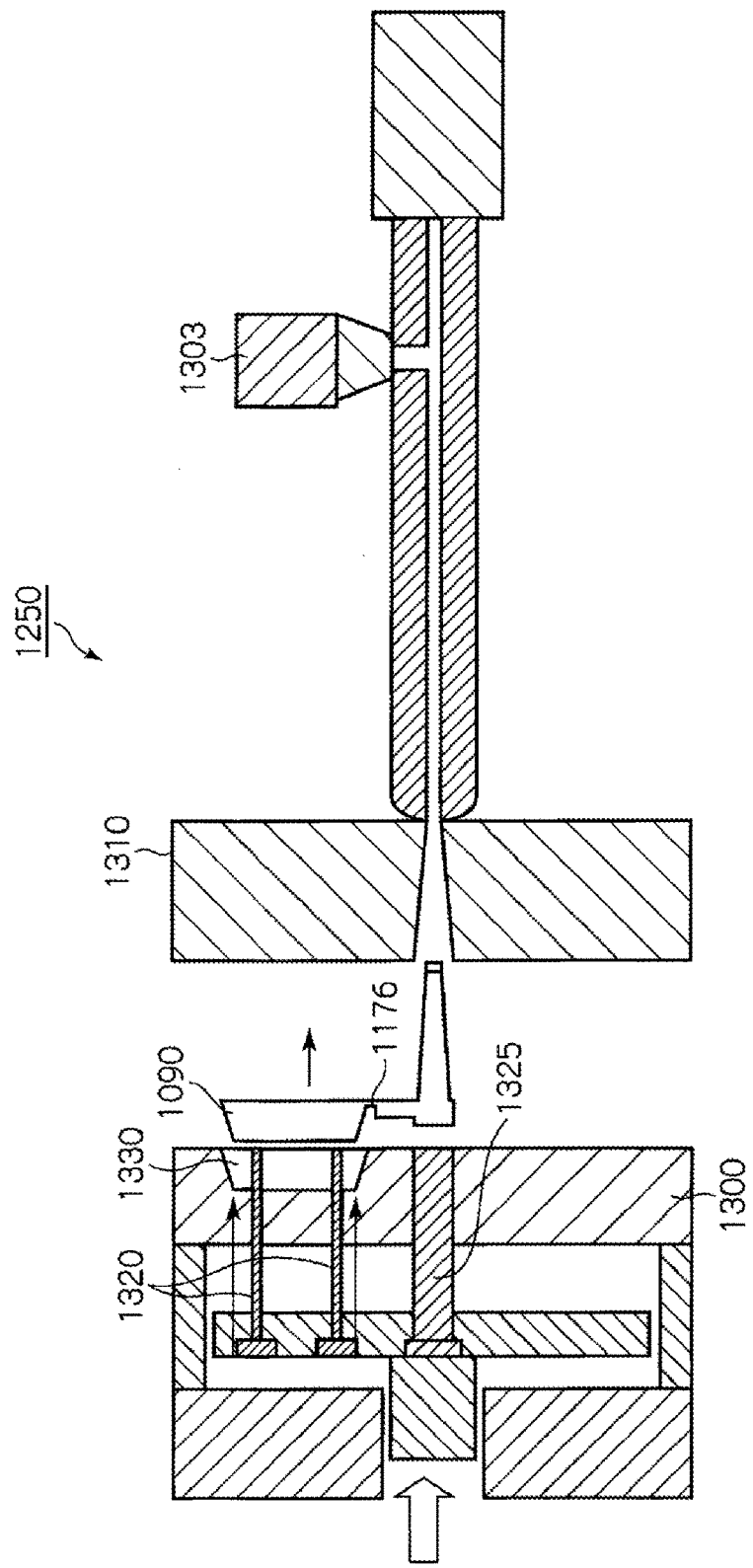
FIG. 12B is a schematic diagram illustrating the process of so-called projecting to release a prism from an injection molding machine.
Figure 13A:
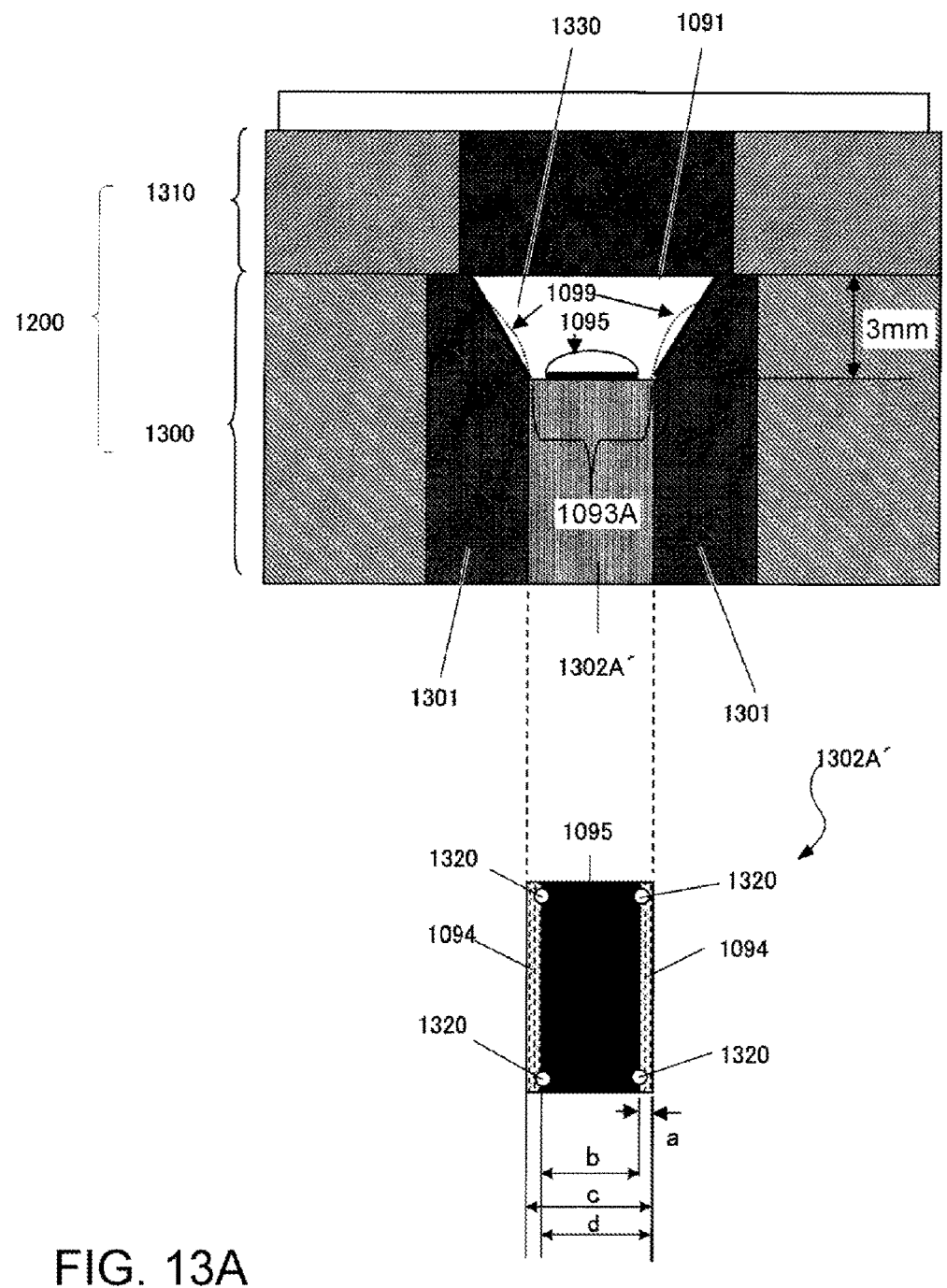
FIG. 13A is a diagram illustrating an example of the relationship between the width (one side) of a high transfer area and the optical surface precision.
Figure 13B:
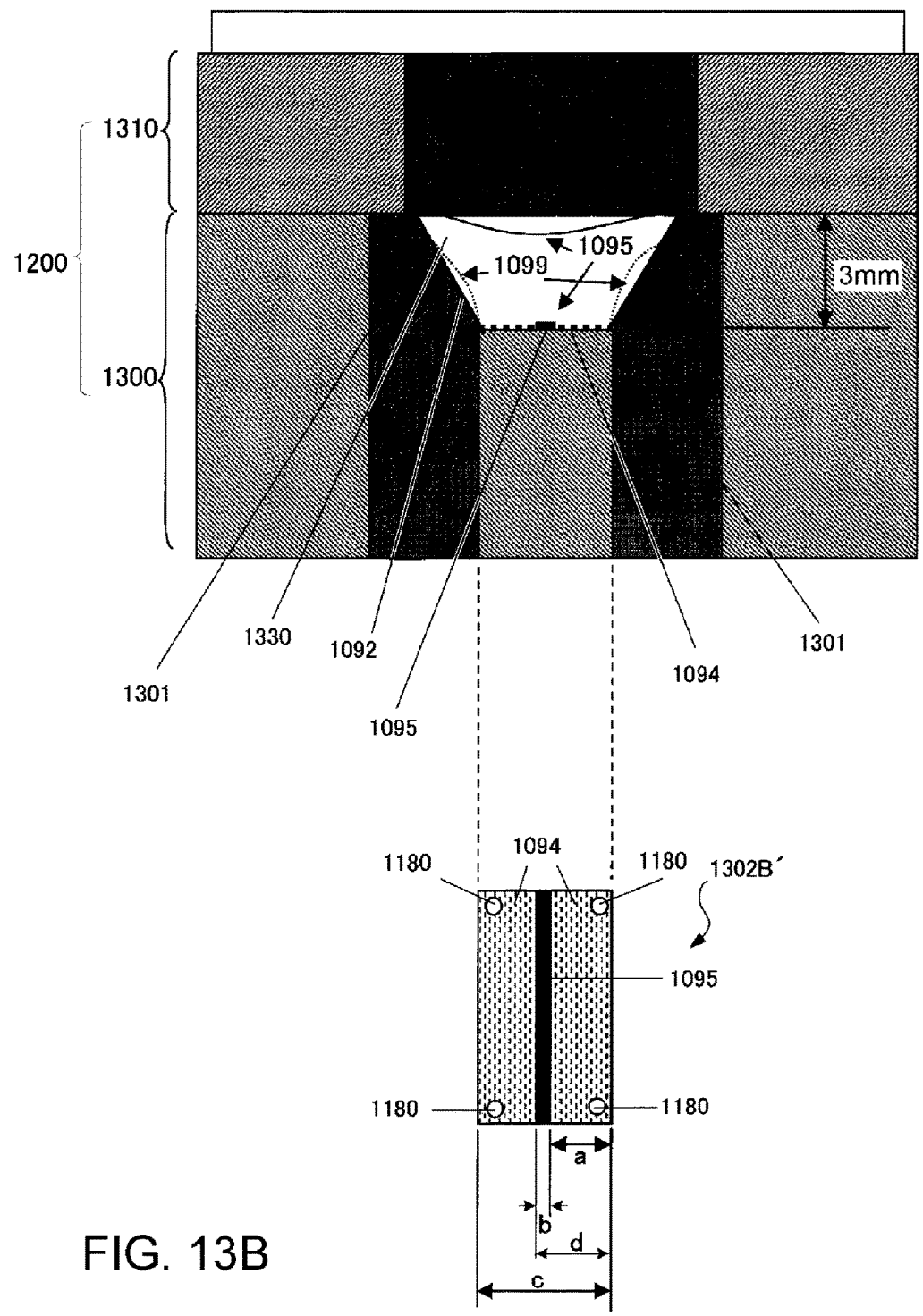
FIG. 13B is a diagram illustrating another example of the relationship between the width (one side) of a high transfer area and the optical surface precision.
Figure 14A:
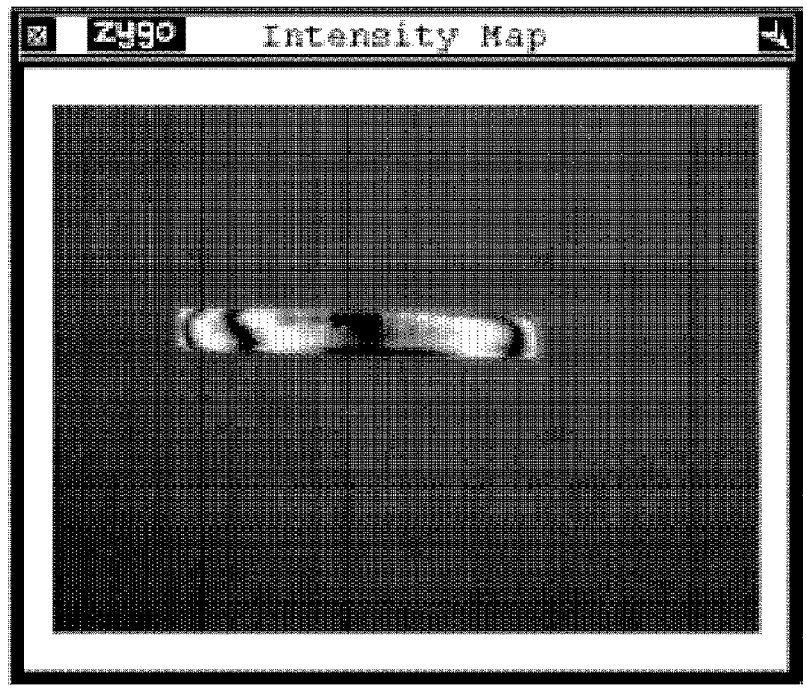
FIG. 14A is a diagram illustrating an interference fringe when there is no surface division.
Figure 14B:
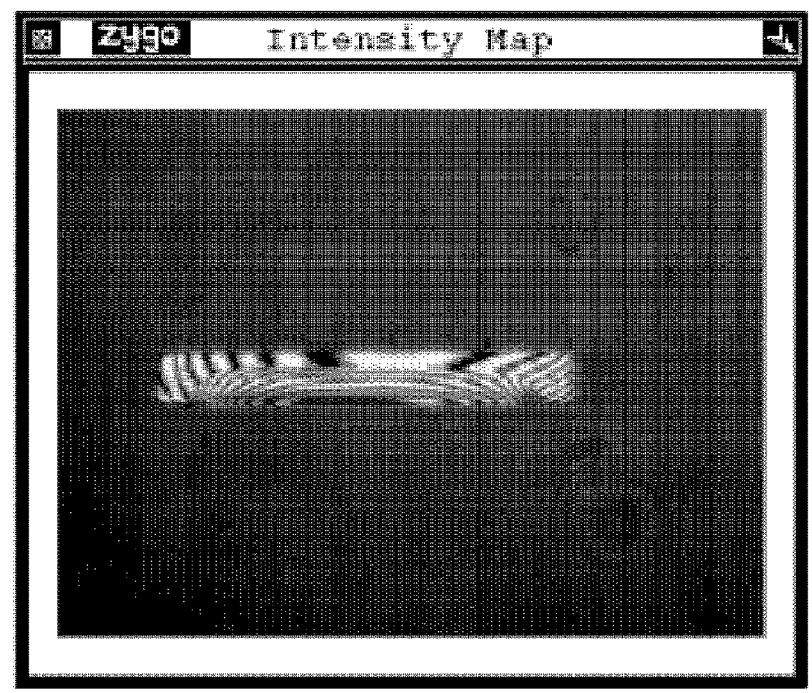
FIG. 14B is a diagram illustrating an interference fringe when there is a surface division.
Figure 14C:
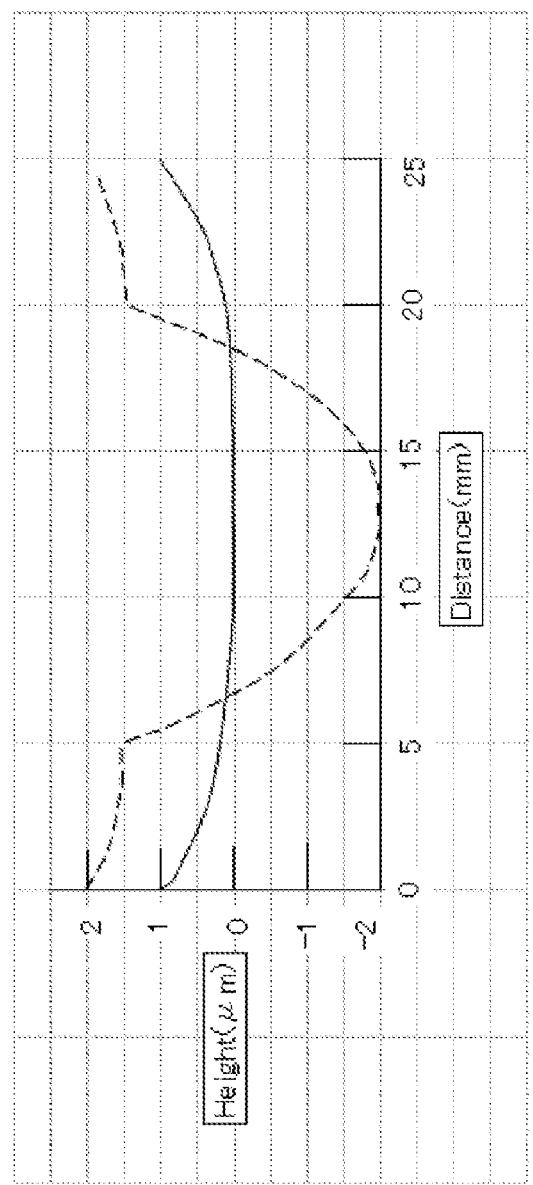
FIG. 14C is a diagram illustrating the relationship between the width and height of a non-optical surface according to the presence/absence of a surface division.
Figure 15:
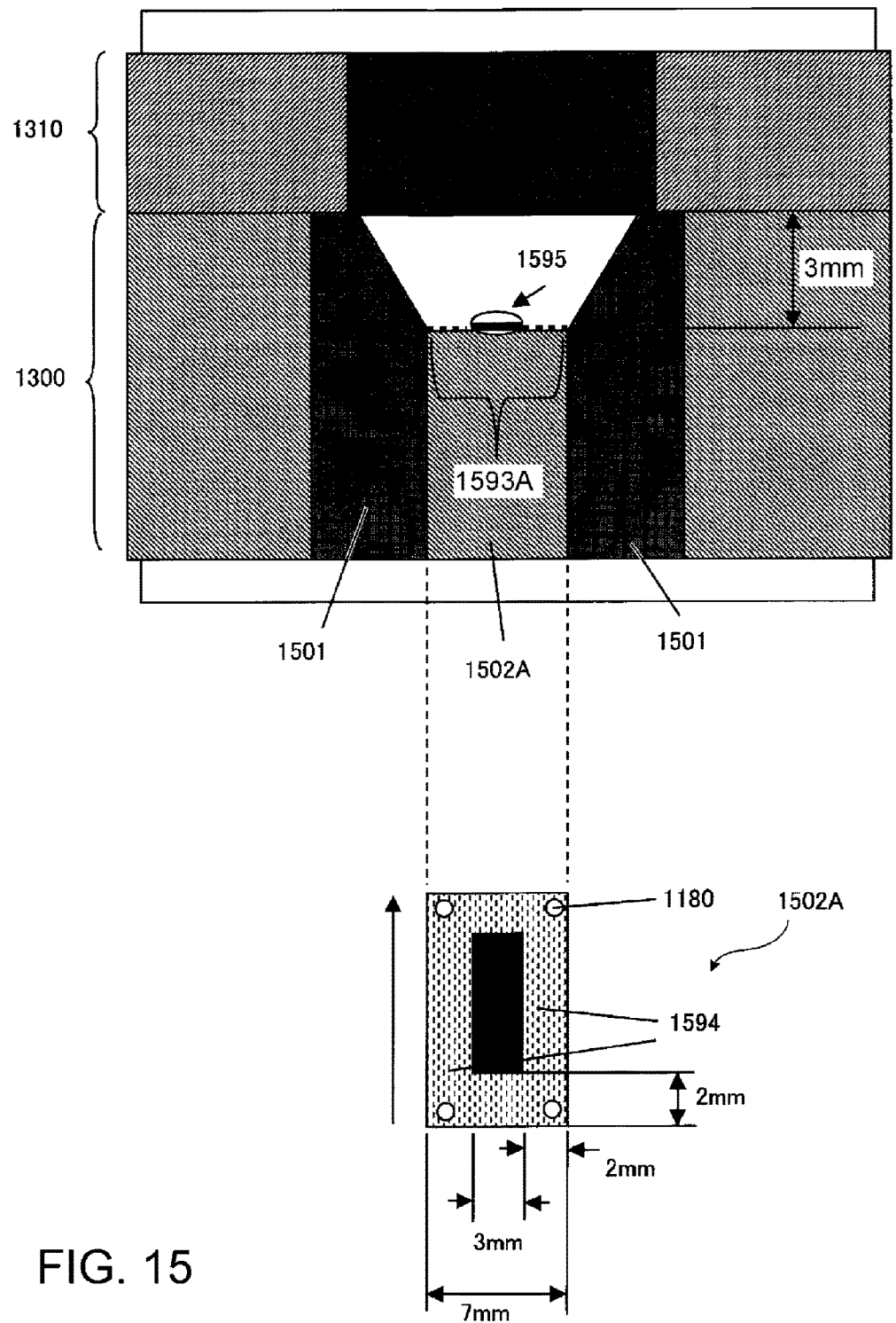
FIG. 15 is a view illustrating a modification of a prism.
Figure 16:
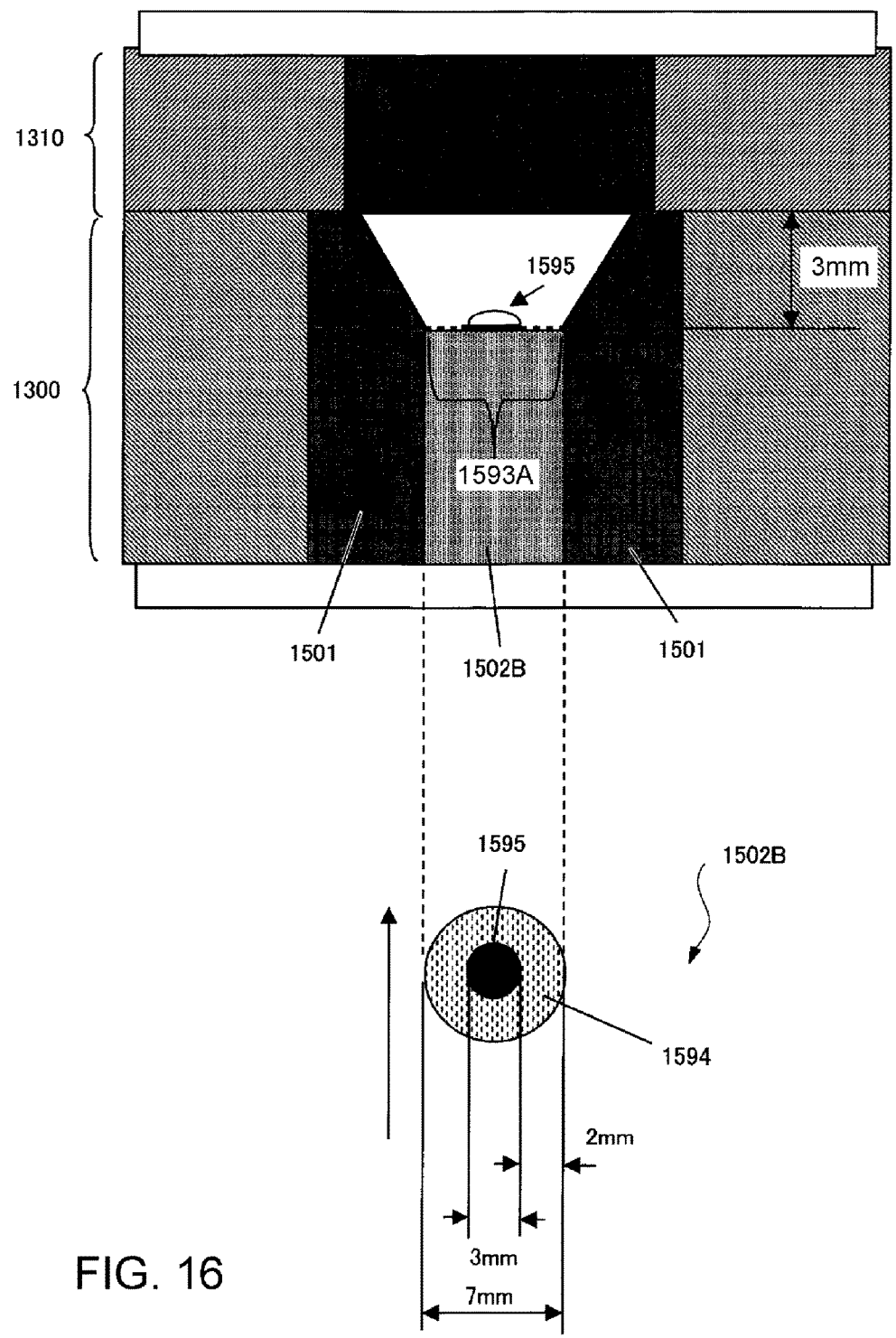
FIG. 16 is a view illustrating another modification of the prism.
Figure 17A:
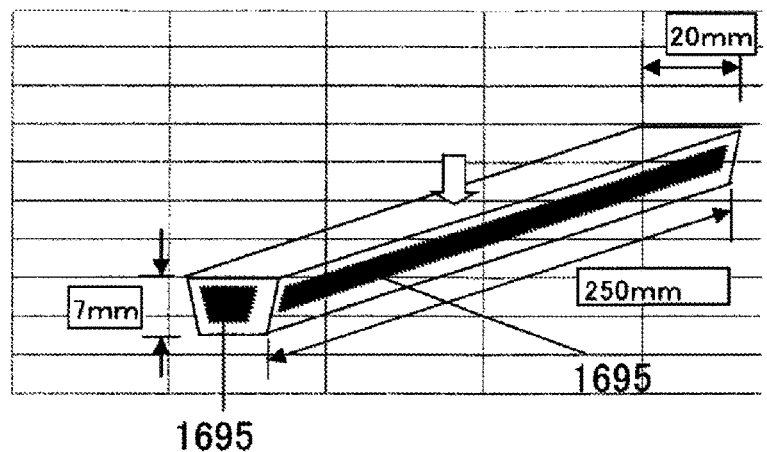
FIG. 17A is a view illustrating still another modification of the prism.
Figure 17B:
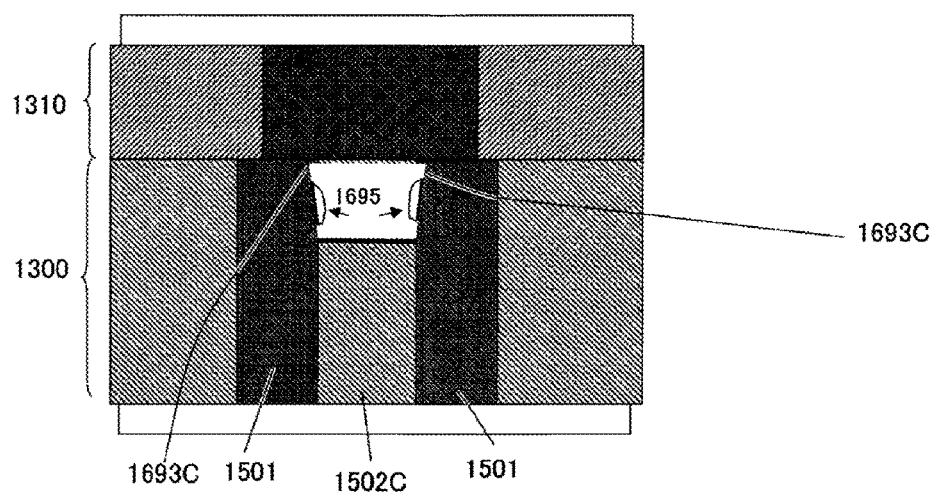
FIG. 17B is a vertical cross-sectional view of FIG. 17A.
Figure 17C:
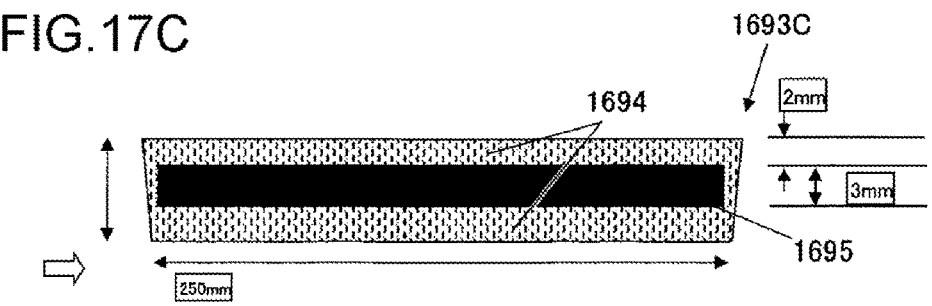
FIG. 17C is a side view of FIG. 17A.
Figure 18:
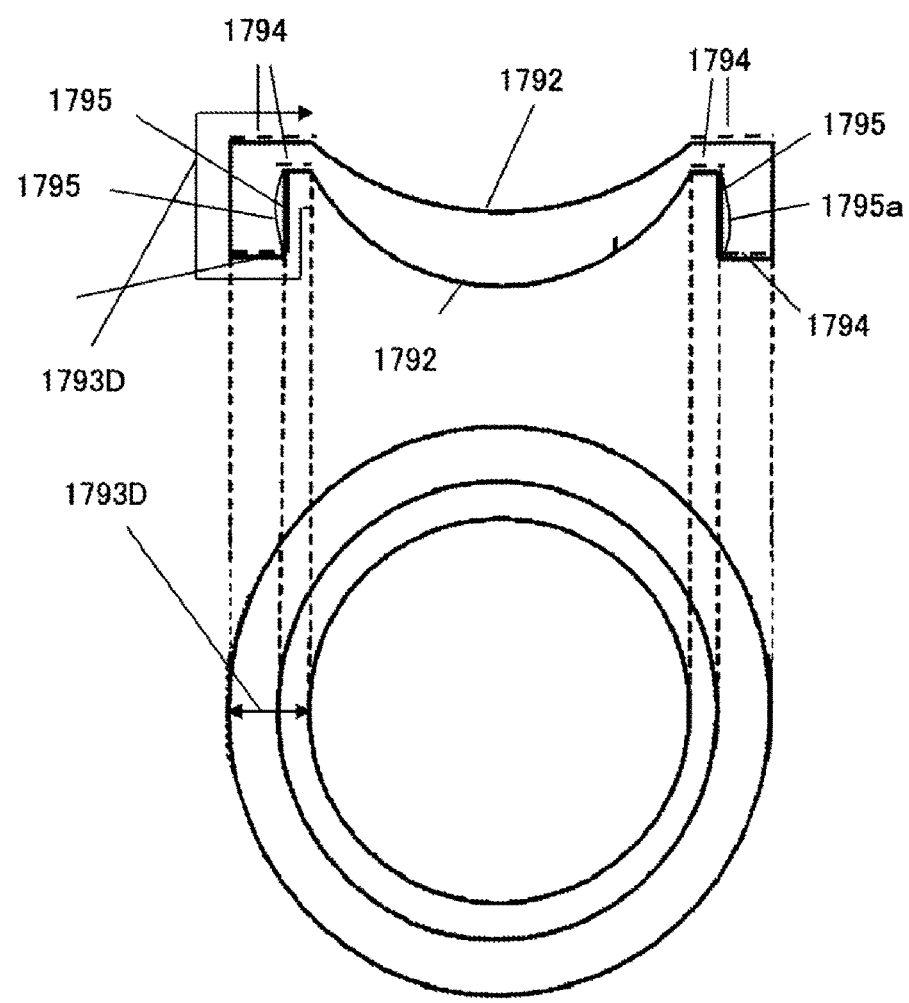
FIG. 18 is a view illustrating a modification of a lens.
Figure 19:
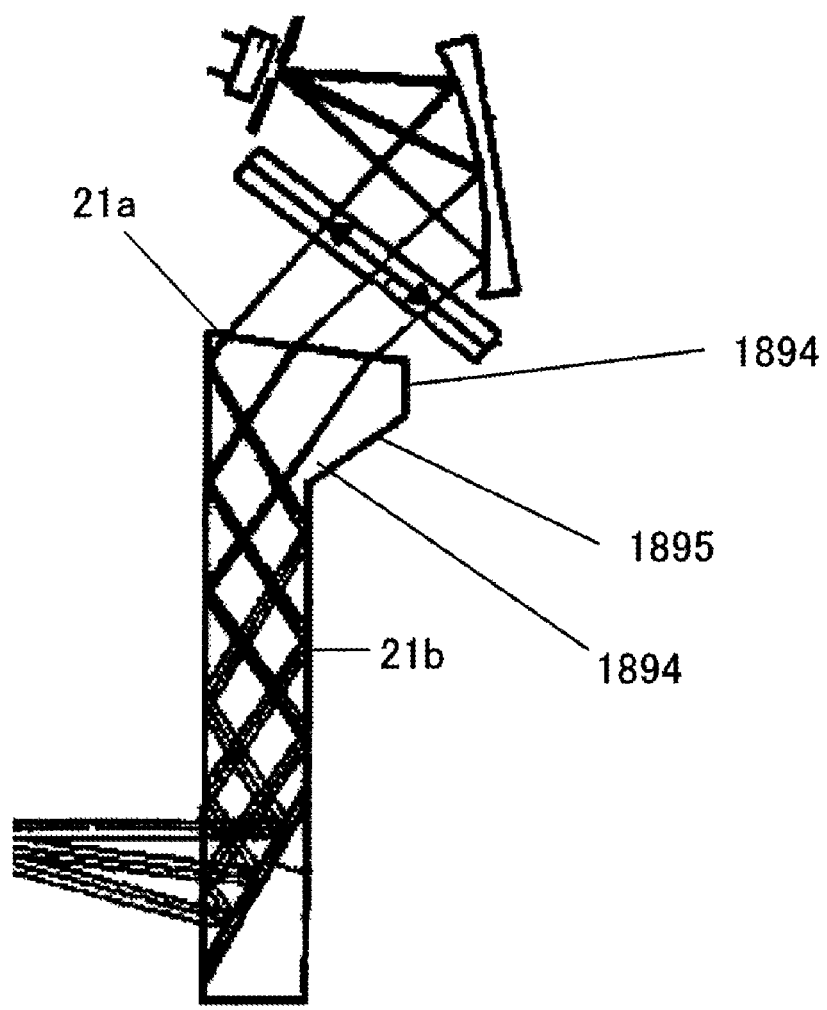
FIG. 19 is a view illustrating another modification of the lens.

FIG. 1 is a double-view for explaining a method for manufacturing an optical element according to Example 1. FIG. 2A is an external perspective view of the optical element in the Example 1. FIG. 2B is an external perspective view of an optical element in another example. FIG. 3 is a table for explaining the evaluation of birefringence distribution and optical surface precision in examples 1 to 6. FIG. 4 is a schematic diagram for explaining a method for manufacturing an optical element according to Example 2. FIG. 5 is a schematic diagram for explaining a method for manufacturing an optical element according to Example 3. FIG. 6 is a schematic diagram for explaining a method for manufacturing an optical element according to Comparative Example 1. FIG. 7 is a schematic diagram for explaining a method for manufacturing an optical element according to Comparative Example 2. FIG. 8 is a schematic diagram for explaining a method for manufacturing an optical element according to Comparative Example 3. FIG. 9 is a schematic diagram for explaining a method for manufacturing an optical element according to Comparative Example 4. FIG. 10 is a table for explaining the evaluation of birefringence distribution and optical surface precision in Comparative Examples 1 to 5. FIG. 11 is a table illustrating the relationship between high transfer area width and optical surface precision within the distance between adjacent optical surfaces. FIG. 12A is a schematic diagram illustrating the process of so-called mold clamping to form a cavity by butting a movable mold against a stationary mold. FIG. 12B is a schematic diagram illustrating the process of so-called projecting to release a prism from an injection molding machine. FIG. 13A is a diagram illustrating an example of the relationship between the width (one side) of a high transfer area and the optical surface precision. FIG. 13B is a diagram illustrating another example of the relationship between the width (one side) of a high transfer area and the optical surface precision. FIG. 14A is a diagram illustrating an interference fringe when there is no surface division. FIG. 14B is a diagram illustrating an interference fringe when there is a surface division. FIG. 14C is a diagram illustrating the relationship between the width and height of a non-optical surface according to the presence/absence of a surface division. FIG. 15 is a view illustrating a modification of a prism. FIG. 16 is a view illustrating another modification of the prism. FIGS. 17A, 17B and 17 C are a perspective view, a vertical cross-sectional view and a side view illustrating still another modification of the prism, respectively. FIG. 18 is a view illustrating a modification of a lens. FIG. 19 is a view illustrating another modification of the lens. FIG. 20 is a table illustrating the evaluation of the optical surfaces of the optical elements illustrated in FIGS. 15 to 19.

In the following, with reference to the drawings, a description is given of a method for manufacturing an optical element by injection molding using a mold. As illustrated in FIG. 2, an optical element 1090A is a dielectric medium made of a resin transparent to the light used, and has the shape of a trapezoid pillar, preferably an isosceles trapezoid pillar. A typical example of the optical element 1090A is a prism. The prism may have a shape other than a trapezoidal pillar shape, or may be replaced by an article having a shape that is unlikely to be of a prism. For example, the prism may have a semi-cylindrical shape, or may be replaced by a plate-like article.

Note that the prism used herein is not limited to particular applications, and it may be an article like a lens. Lenses for other applications are described later with reference to FIGS. 18 and 19.

As illustrated in FIG. 2A, the optical element 1090A includes optical surfaces 1091 and 1092 and a non-optical surface 1093A. The non-optical surface 1093A faces the optical surface 1091. One of the optical surfaces 1092 serves as an incident surface and the other serves as an output surface. The optical surface 1091 serves as a reflective surface. Regarding the shape, the optical element may include a positioning part 1088 on side surfaces as illustrated in FIG. 2B. Still other shapes of the optical element are described later.

[Method for Manufacturing the Optical Element]

The optical element 1090A is fabricated through a predetermined process using an injection molding machine. Here, the injection molding process using an injection mold is briefly described with reference to FIGS. 12A and 12B. FIG. 12A is a schematic diagram illustrating the process of so-called mold clamping to form a cavity by butting a movable mold against a stationary mold. FIG. 12B is a schematic diagram illustrating the process of so-called projecting to demold an optical element from an injection molding machine.

An insert 1300 of movable mold cores (hereinafter referred to as "movable mold core insert") includes a movable rear surface core 1302A, and a pair of movable mirror surface cores 1301 and 1301 arranged to sandwich the movable rear surface core 1302A. The surface area of the movable rear surface core 1302A includes a transfer area 1095 where sink marks are desired (hereinafter referred to as "sink forming area"), and high transfer areas 1094 and 1094, where no sink mark is desired, arranged adjacent to both sides of the transfer area 1095. Push pins 1320 are arranged in the four corners of the surface area.

As illustrated in FIG. 1, part 1200 of an injection mold (hereinafter for convenience referred to as "injection mold") includes the movable mold core insert 1300 having a recess 1330 (cavity) formed in the shape of an injection-molded article (the optical element 1090A), an insert 1310 of fixed mold cores (hereinafter referred to as "fixed mold core insert") having the function of closing the recess 1330 as being butted against the movable mold core insert 1300, the push pins 1320, and an ejector member (not illustrated). A resin material, i.e., the material of the injection-molded article, is supplied to the cavity from a cylinder 1260.

As illustrated in FIG. 12A, an injection mold 1250 includes the movable mold core insert 1300 having the recess 1330 (cavity) formed in the shape of the injection-molded article, the fixed mold core insert 1310 having the function of closing the recess 1330 as being butted against the movable mold core insert 1300, the push pins 1320, an ejector member 1325, and the cylinder 1260 that supplies resin material, i.e., the material of the injection-molded article, to the cavity.

The injection molding process includes a mold clamping step, an injection step, a pressure holding step, a cooling step, a mold opening step, and a pushing/product extraction step. The injection molding is performed in this order. In the mold clamping step, the movable mold core insert 1300 is butted against the fixed mold core insert 1310 to close the recess 1330 formed in the movable mold core insert 1300, thereby forming a cavity. Next, a resin material 1305 (molten resin) is injected from a resin supply furnace 1303 to fill the cavity therewith (injection step). The resin material travels through a sprue 1177 and a gate 1176, and is filled in the cavity. When filled in the cavity of the mold, the resin material is cooled in the mold and shrinks. Since the shrinkage causes a change in the volume, this shrinking action results in a dimensional change of a molded article, a shape transfer failure, and the like. To prevent them, the amount of resin reduced by the shrinkage is compensated by applying a holding pressure on the molding machine side (pressure holding step). Then, the resin material is cooled in the mold until its temperature decreases to a level at which it can be extracted from the mold (cooling step).

When the resin material 1305 is sufficiently cooled after a lapse of a predetermined time, as illustrated in FIG. 12B, the movable mold core insert 1300 is separated from the fixed mold core insert 1310 (mold opening step). At this time, the molded article comes with the movable mold core insert 1300. By sliding the push pins 1320 against the fixed mold core insert 1310 (pushing step), the optical element 1090A is demolded. The optical element 1090A is connected to a substrate and a flow path forming component (not illustrated) to obtain a sensor chip 1026.

Shrinkage occurs in a sink surface 1175 of the optical element 1090A during the above-mentioned pressure holding step. The shrinkage is caused in the sink surface 1175 with the setting of a holding pressure of 65 MPa or less. Besides, as a push pin mark is generally made on the injection-molded article in the pushing step, push pin marks 1180 are formed on the sink surface 1175 of the optical element 1090A correspondingly to the arrangement of the push pins 1320.

In each of examples described later (Examples 1 to 6), the birefringence distribution and the optical surface precision (the optical surface precision of the optical surfaces 1091 and 1092) of an optical element were evaluated by changing the material, thermal conductivity, and surface roughness of the movable rear surface core 1302A (described later) using the injection mold 1200 having the high transfer area 1094 with a short-side width of a mm, the sink forming area 1095 with a short-side width of b mm, and the movable rear surface core 1302A with a short-side width of c mm. In addition, evaluation (described later) was performed using a ratio of distance a to distance d of 40%, where the distance d was obtained by subtracting the one-side high transfer area width from the adjacent optical surface distance, and referred to as distance to the adjacent optical surface.

The high transfer area 1094 and the sink forming area 1095 are areas that are formed in the non-optical surface 1093A of the optical element 1090A. However, since the rear surface area of the movable rear surface core 1302A corresponds to the non-optical surface 1093A, hereinafter it is described for convenience as also having the high transfer area 1094 and the sink forming area 1095. In the following description, the optical surface 1091 facing the non-optical surface (not adjacent to the non-optical surface) is referred to as opposite optical surface (fixed optical surface), and the optical surface 1092 adjacent to the non-optical surface is referred to as adjacent optical surface.

[Thermal Conductivity (W/m·K) of the Movable Rear Surface Core]

The first thermal conductivity in the sink forming area 1095 is in a range of 0.6 W/m·K to 20 W/m·K. The second thermal conductivity in the high transfer area 1094 is in a range of 8 W/m·K to 200 W/m·K. Desirably, the first thermal conductivity is lower than the second thermal conductivity. This is because, when the non-optical surface has a lower thermal conductivity in the part where shrinkage is desired to concentrate as compared to the part which is desirably less likely to shrink, the shrinkage does not extend into an optical surface adjacent thereto, and the surface precision of the optical surface can be improved.

Preferably, the first thermal conductivity is in a range of 8 W/m·K to 200 W/m·K. Examples of mold material that satisfies the above numerical range include plating and copper alloy. Preferably, the second thermal conductivity is in a range of 0.6 W/m·K to 20 W/m·K. Examples of mold material that satisfies the above numerical range include SUS material coated or adhered with thermal insulation resin material, SUS material laminated with a ceramic layer by thermal spraying or pasting, SUS material laminated with Ni—P plating, and STAVAX material.

(Regarding the Volume of the Mold Material for the Sink Forming Area in the Surface of the Rear Surface Core)

Preferably, the mold material having the first thermal conductivity of the sink forming area has a thickness as thin as possible so that the distribution of the birefringence is stable and uniform without causing uneven cooling. Needless to say, the thickness is determined after being appropriately adjusted depending on the specifications required for the optical element. For example, there may be such conditions that the surface of the sink forming area, whose base material is STAVAX, is plated uniformly as a low thermal conductivity material, lapping is applied to the sink forming area, blast treatment is applied to the edge area of the sink forming area, and the edge area has a larger surface roughness Ra. With such a structure, sink marks can be induced on the rear surface, and the edge area subjected to the blast treatment exhibits higher transfer. Thus, it is possible to reduce the influence of surface division on the optical surface.

The thermal insulation resin material described herein refers to those coated with polyimide excellent in heat resistance and chemical resistance, or films to which a heat-resistant silicone-based adhesive based on polyimide is applied. Besides, the STAVAX material is chromium alloy stainless tool steel, and is a metal particularly excellent in corrosion resistance and wear resistance. Recommended hardness level is about 45-54 HRC, the density at room temperature is 7800 kg/m3, and the specific heat is 460 J/(kg·k). The STAVAX material contains such components as Cr (chromium), V (vanadium), Mn (manganese), Si (silicon), C (carbon), and the like. It is desirable that the second thermal conductivity be larger than the first thermal conductivity.

[Surface Roughness Ra (μm) of the Movable Rear Surface Core]

The surface of the high transfer area 1094 is subjected to blast treatment, and also referred to as embossed surface. The surface roughness Ra of the embossed surface (center line average roughness: JIS standard, hereinafter the same applies) is desirably in a range of 0.5 μm to 100 μm. The surface roughness Ra of the sink forming area 1095 is desirably in a range of 0.1 nm to 0.5 μm.

If the surface roughness Ra of the sink forming area 1095 is, for example, 0.1 nm, the surface is a so-called mirror surface, and is finished by polishing and grinding. A surface with a surface roughness Ra of less than 0.5 μm is obtained by applying blast treatment with very small particles as also referred to as Iepco treatment after grinding.

Further, the difference in the surface roughness Ra between the high transfer area 1094 and the sink forming area 1095 is preferably not less than 0.3 μm and less than 100 μm. This is because, when the sink-forming area 1095 has a surface roughness at a level not affecting demolding, and the high transfer area 1094 has a surface roughness at a level achieving an anchor effect during demolding, shrinkage in the non-optical surface 1093A does not extend into the optical surface 1092 adjacent thereto, and the surface precision of the optical surfaces 1091 and 1092 can be improved.

Described below are results of the evaluation of the optical element measured by changing the values of the thermal conductivity and surface roughness Ra of the high transfer area 1094 and the sink forming area 1095. Incidentally, regarding the evaluation measurements, a total of 11 evaluation measurements were carried out by Examples 1 to 6 and Comparative Examples 1 to 5.

Example 1

In Example 1, STAVAX was used as the material for both the sink forming area 1095 and the high transfer area 1094 in the movable rear surface core 1302A illustrated in FIG. 1, and their thermal conductivity was 20 W/m·K. In the non-optical surface area sections in the table of FIG. 3, the sink forming area 1095 is represented by reference letter A (short-side central area), and the high transfer area 1094 is represented by reference letter B (optical surface adjacent area) in the table. The same applies in Examples 2 to 6 described below.

Example 1 was conducted using a mold in which the sink forming area 1095 had a surface roughness Ra of 0.2 μm and the high transfer area 1094 had a surface roughness Ra of 0.7 μm. Incidentally, the mold used was capable of injection-molding an optical element having the sink forming area 1095 with a short-side width of 3 mm and the high transfer area 1094 with a short-side width of 2 mm.

A description is given below of results of the evaluation on the optical element 1090 injection-molded by the injection mold 1200 that satisfies the above conditions. The birefringence distribution and the optical surface precision of the optical element injection-molded under the above conditions were measured as evaluation items.

<Evaluation Criteria>

Regarding the birefringence distribution of the optical element molded by a mold constituting the part 1200 of the injection mold (see FIG. 1) that satisfies the above conditions, it is determined to be good when, in plus/minus 5 mm (+/−5 mm) of the long-side center of the prism, P polarization ratio (also referred to as P polarization maintaining ratio) is 93% or more, and the distribution is less than 4% in PV. As for the optical surface precision, the presence or absence of a surface division in a white light interferometer is used an evaluation criterion, and, if there is no surface division, it is determined to be good. Incidentally, evaluation was performed using the same evaluation criteria also in Examples 2 to 6 and Comparative Examples 1 to 5 described below. Here, P polarization ratio (P polarization maintaining ratio) is defined as the maintenance ratio of P polarization component of P-polarized light incident on the prism in the section from the incident surface to the reflective surface.
<Evaluation Results>
In Example 1, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Example 21

Example 2 is different from Example 1 in that a ceramic layer 1097 is further formed beneath a sink forming area 1096 of a movable rear surface core 1302B illustrated in FIG. 4. Ni—P plating (thickness t: 20 μm) is used as the material for the sink forming area 1096. STAVAX is used as the material for the high transfer area 1094.

Example 2 was conducted using a mold in which the thermal conductivity of the Ni—P plating was 8 W/m·K, the thermal conductivity of the ceramic layer 1097 was 3 W/m·K, and the thermal conductivity of the STAVAX material was 20 W/m·K, and besides, the sink forming area 1096 had a surface roughness of Ra 0.05 μm, and the high transfer area 1094 had a surface roughness of Ra 0.7 μm. Incidentally, the mold used was capable of injection-molding an optical element having the sink forming area 1096 with a short-side width of 3 mm and the high transfer area 1094 with a short-side width of 2 mm.

A description is given below of results of the evaluation on an optical element 1090B injection-molded by a mold constituting the part 1200 of the injection mold, which satisfies the above conditions. The birefringence distribution and the optical surface precision of the optical element injection-molded under the above conditions were measured as evaluation items.
<Evaluation Results>
In Example 2, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Example 31

In Example 3, Ni—P plating (thickness t: 500 μm) is used as the material for a sink forming area 1098. STAVAX is used as the material for the high transfer area 1094.

Example 3 was conducted using a mold in which the thermal conductivity of the Ni—P plating was 8 W/m·K and the thermal conductivity of the STAVAX material was 20 W/m·K, and besides, the sink forming area 1098 had a surface roughness of Ra 0.05 μm, and the high transfer area 1094 had a surface roughness of Ra 0.7 μm. Incidentally, the mold used was capable of injection-molding an optical element having the sink forming area 1098 with a short-side width of 3 mm and the high transfer area 1094 with a short-side width of 2 mm.

A description is given below of results of the evaluation on an optical element 1090C injection-molded by a mold constituting the movable mold core insert 1300, which satisfies the above conditions. The birefringence distribution and the optical surface precision of the optical element injection-molded under the above conditions were measured as evaluation items.
<Evaluation Results>
In Example 3, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Example 41

Example 4 is different from Example 1 in that the sink-forming area 1095 of the movable rear surface core 1302A illustrated in FIG. 1 is made of heat resistant resin material (polyimide film bonding or polyimide coating (thickness: 50 μm)). STAVAX is used as the material for the high transfer area 1094.

Example 4 was conducted using a mold in which the thermal conductivity of the heat resistant resin material was 0.6 W/m·K and the thermal conductivity of the STAVAX material was 20 W/m·K, and besides, the sink forming area 1095 had a surface roughness of Ra 0.07 μm, and the high transfer area 1094 had a surface roughness of Ra 0.7 μm. Incidentally, the mold used was capable of injection-molding an optical element having the sink forming area 1095 with a short-side width of 3 mm and the high transfer area 1094 with a short-side width of 2 mm.

A description is given below of results of the evaluation on the optical element injection-molded by a mold constituting the injection mold core insert 1200, which satisfies the above conditions. The birefringence distribution and the optical surface precision of the optical element injection-molded under the above conditions were measured as evaluation items.
<Evaluation Results>
In Example 4, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Example 5

In Example 5, evaluation was carried out using a mold in which STAVAX was used as the material for the sink forming area 1095 in the movable rear surface core 1302A illustrated in FIG. 1, and the high transfer area 1094 was made of a copper alloy.

The thermal conductivity of the STAVAX material was 20 W/m·K, and the surface roughness of the sink forming area 1095 was Ra 0.2 μm. The thermal conductivity of the copper alloy was 200 W/m·K, and the surface roughness of the high transfer area 1094 was Ra 0.7 μm. Incidentally, the mold used was capable of injection-molding an optical element having the sink forming area 1095 with a short-side width of 3 mm and the high transfer area 1094 with a short-side width of 2 mm.

A description is given below of results of the evaluation on the optical element injection-molded by a mold constituting the part 1200 of the injection mold that satisfies the above conditions. The birefringence distribution and the optical surface precision of the optical element injection-molded under the above conditions were measured as evaluation items.

<Evaluation Results>

In Example 5, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Example 6

In Example 6, evaluation was carried out using a mold in which a ceramic bonding layer was used as the material for the sink-forming area 1095 of the movable rear surface core 1302A illustrated in FIG. 1, and the high transfer area 1094 was made of a copper alloy.

The thermal conductivity of the ceramic bonding layer was 3 W/m·K, and the surface roughness of the sink forming area 1095 was Ra 0.2 μm. The thermal conductivity of the copper alloy was 200 W/m·K, and the surface roughness of the high transfer area 1094 was Ra 0.2 μm. Incidentally, the mold used was capable of injection-molding an optical element having the sink forming area 1095 with a short-side width of 3 mm and the high transfer area 1094 with a short-side width of 2 mm.

A description is given below of results of the evaluation on the optical element 1090 injection-molded by a mold constituting the part 1200 of the injection mold that satisfies the above conditions. The birefringence distribution and the optical surface precision of the optical element injection-molded under the above conditions were measured as evaluation items.

<Evaluation Results>

In Example 6, in plus/minus 5 mm (+/−5 mm) of the long-side center of the prism, as illustrated in the table of FIG. 3, P polarization ratio was 93% or higher, and the distribution was less than 4% in PV. Accordingly, the birefringence distribution was favorable. Further, no sink mark appeared on the optical surface adjacent to the sink-forming area, and it was confirmed from the evaluation of interference fringe by a white light interferometer that there was no surface division. Thus, the optical surface precision was determined to be good.

Comparative Example 1

In Comparative Example 1, as illustrated in FIG. 6, part 1210 of the injection mold includes a movable mold core insert 1400 having the recess 1330 (cavity) formed in the shape of an injection-molded article (optical element 1100A), the fixed mold core insert 1310 having the function of closing the recess 1330 as being butted against the movable mold core insert 1400, the push pins 1320, and an ejector member (not illustrated). A resin material, i.e., the material of the injection-molded article, is supplied to the cavity from the cylinder 1260. Incidentally, like reference numerals depict like components as those described in Example 1.

The movable mold core insert 1400 includes a movable rear surface core 1402A, and a pair of the movable mirror surface cores 1301 and 1301 arranged to sandwich the movable rear surface core 1402A.

In Examples 1 to 6, the rear surface of the movable rear surface core has a sink forming area and high transfer areas formed on both sides of it. On the other hand, in Comparative Example 1, the entire rear surface of the movable rear surface core 1402A forms a transfer area 1110 differently from Examples 1 to 6. The push pins 1320 are arranged in the four corners of the surface area. Here, the mold used is capable of injection-molding the optical element 1100A having the transfer area 1110 with a short-side width of 7 mm.

In Comparative Examples 1 to 4, the non-optical surface area sections are made of the same material and have the same thermal conductivity and surface roughness over the entire area. On the other hand, in Comparative Example 5, different surface treatments are applied to the short-side central area and the optical surface adjacent area. Therefore, in the table of FIG. 10, the short-side central area A and the optical surface adjacent area B are represented by reference letters in the non-optical surface area sections for convenience.

In Comparative Examples 1 to 5 described below, the birefringence distribution and the optical surface precision of an optical element were evaluated by changing the material, thermal conductivity, and surface roughness of the movable rear surface core (described later) using an injection mold having the transfer area with a short-side width of 7 mm in the movable rear surface core. The transfer area is an area that is formed in the non-optical surface of the optical element. However, since the rear surface area of the movable rear surface core corresponds to the non-optical surface, hereinafter it is described for convenience as also having the transfer area.

Comparative Example 1 was conducted using a mold, in which the transfer area 1110 was made of STAVAX, and had a thermal conductivity of 20 W/m·K and a surface roughness of Ra 0.2 μm. Incidentally, Iepco treatment had been applied to the transfer area 1110 of the movable rear surface core 1402A after grinding.

A description is given below of results of the evaluation on the optical element 1100A injection-molded by the part 1200 of the injection mold that satisfies the above conditions. The birefringence distribution and the optical surface precision (the surface precision of the opposite optical surface and the adjacent optical surface) of the optical element injection-molded under the above conditions were measured as evaluation items.

<Evaluation Results>

In Comparative Example 1, in plus/minus 5 mm (+/−5 mm) of the long-side center of the prism, as illustrated in the table of FIG. 10, P polarization ratio was 93% or higher, and the distribution was less than 4% in PV. Accordingly, the birefringence distribution was favorable. Further, no sink mark appeared on the optical surface 1091 (the opposite optical surface or the fixed optical surface), and the optical surface precision was determined to be good. However, surface division was caused in the optical surface 1092 (the adjacent optical surface). Accordingly, it was determined to be difficult to achieve both good birefringence distribution and excellent optical surface precision.

Comparative Example 2

Comparative Example 2 was conducted using a mold (see FIG. 7) in which a transfer area 1120 was made of STAVAX, and had a thermal conductivity of 20 W/m·K and a surface roughness of Ra 0.7 µm. Incidentally, graining had been applied to the surface of a movable rear surface core 1402B.

A description is given below of results of the evaluation on an optical element 1100B injection-molded by the injection mold 1210 that satisfies the above conditions. The birefringence distribution and the optical surface precision of the optical element injection-molded under the above conditions were measured as evaluation items.

<Evaluation Results>

In Comparative Example 2, in plus/minus 5 mm (+/−5 mm) of the long-side center of the prism, as illustrated in the table of FIG. 10, the distribution of P polarization ratio was not less than 4% in PV, and the birefringence distribution was not favorable. Further, sink marks appeared on the optical surface 1091. Therefore, in Comparative Example 2, it was determined to be difficult to achieve both good birefringence distribution and excellent optical surface precision.

Comparative Example 3

Comparative Example 3 was conducted using a mold (see FIG. 8), in which a transfer area 1130 was made of Ni—P plating (thickness t: 500 µm), and had a thermal conductivity of 8 W/m·K and a surface roughness of Ra 0.5 µm. Incidentally, Iepco treatment had been applied to the surface of a movable rear surface core 1402C.

A description is given below of results of the evaluation on an optical element 1100C injection-molded by the injection mold 1210 that satisfies the above conditions. The birefringence distribution and the optical surface precision of the optical element injection-molded under the above conditions were measured as evaluation items.

<Evaluation Results>

In Comparative Example 3, in plus/minus 5 mm (+/−5 mm) of the long-side center of the prism, as illustrated in the table of FIG. 10, P polarization ratio was 93% or higher, and the distribution was less than 4% in PV. Accordingly, the birefringence distribution was favorable. Further, no sink mark and stripe appeared on the optical surface 1091, and the optical surface precision was determined to be good. However, sink marks were formed in the optical surface 1092. Accordingly, it was determined to be difficult to achieve both good birefringence distribution and excellent optical surface precision.

Comparative Example 4

Comparative Example 4 was conducted using a mold (see FIG. 9), in which a transfer area 1140 was made of a ceramic material, and had a thermal conductivity of 3 W/m·K and a surface roughness of Ra 0.6 µm. Incidentally, no treatment was applied to the surface of the movable rear surface core 1402B.

A description is given below of results of the evaluation on an optical element 1100D injection-molded by the injection mold 1210 that satisfies the above conditions. The birefringence distribution and the optical surface precision of the optical element injection-molded under the above conditions were measured as evaluation items.

<Evaluation Results>

In Comparative Example 4, in plus/minus 5 mm (+/−5 mm) of the long-side center of the prism, as illustrated in the table of FIG. 10, the distribution of P polarization ratio was not less than 4% in PV, and the birefringence distribution was not favorable. Besides, no sink mark and surface division appeared on the optical surfaces 1091 and 1092, and the optical surface precision was determined to be good. Accordingly, it was determined to be difficult to achieve both good birefringence distribution and excellent optical surface precision.

Comparative Example 5

Comparative Example 5 is an example of evaluation that was conducted differently from Comparative Examples 1 to 4 using a mold (not illustrated), in which the short-side central area (A) of the transfer area has a surface roughness Ra different from a surface roughness Ra of the optical surface adjacent areas (B) formed on both sides of the short-side central area (A).

The transfer area was made of STAVAX, and had a thermal conductivity of 3 W/m·K. The short-side central area (A) had a surface roughness of Ra 0.05 µm, and had been mirror-finished. The optical surface adjacent area (B) had a surface roughness of Ra 0.2 µm, and had been subjected to Iepco treatment. Incidentally, the mold used was capable of injection-molding an optical element having the mirror-finished short-side central area (A) with a short-side width of 3 mm and the optical surface adjacent area (B) subjected to Iepco treatment with a short-side width of 2 mm.

A description is given below of results of the evaluation on the optical element injection-molded by the injection mold that satisfies the above conditions. The birefringence distribution and the optical surface precision of the optical element injection-molded under the above conditions were measured as evaluation items.

<Evaluation Results>

In Comparative Example 5, in plus/minus 5 mm (+/−5 mm) of the long-side center of the prism, as illustrated in the table of FIG. 10, P polarization ratio was 93% or higher, and the distribution was less than 4% in PV. Accordingly, the birefringence distribution was favorable. Further, no sink mark appeared on the optical surface (fixed optical surface) opposite to the non-optical surface, and the optical surface precision was determined to be good. However, in the evaluation by a white light interferometer, surface division was caused in the optical surface adjacent to the non-optical surface. Accordingly, it was determined to be difficult to achieve both good birefringence distribution and excellent optical surface precision.

[Relationship Between the Width of the High Transfer Area (One Side) and the Optical Surface Precision]

In the following, taking FIG. 1 as an example, a description is given of the relationship between the length of the high transfer area 1094 (one side width) and the adjacent optical surface precision. The adjacent optical surface precision refers to the precision of the "adjacent optical surface" described above. The adjacent optical surface distance as used herein refers to the length (width: c mm) of the movable rear surface core 1302 in a position between the adjacent optical surfaces.

A high transfer area width where the adjacent optical surface distance is c (mm) and a ratio (%) of the width a (mm) of one of the high transfer areas 1094 to the distance d (mm) to the adjacent optical surface are obtained.

Incidentally, the high transfer area width refers to the distance between the adjacent optical surface and the sink forming area. In the example of FIG. 1, for obtaining the ratio described above to explain the evaluation of the one-side high transfer area width, a ratio is obtained using a value (d in FIG. 1) obtained by subtracting the one-side high transfer area width from the adjacent optical surface distance as the denominator and the high transfer area width (a in FIG. 1) as the numerator.

In the example of FIG. 13A, the birefringence distribution and the optical surface precision (the optical surface precision of the optical surfaces 1091 and 1092) of an optical element were evaluated by changing the material, thermal conductivity, and surface roughness of the movable rear surface core 1302A (described later) using the injection mold 1200 in which the high transfer area width was a (mm), the short-side width of the sink forming area 1095 (sink area length) was b (mm), and the adjacent optical surface distance was c (mm). Here, the evaluation was performed assuming that the ratio of the high transfer area width a (mm) to the distance d (mm) to the adjacent optical surface is 13%. For example, if the width of the high transfer area 1094 (one side) is 0.8 mm and the adjacent optical surface distance is 7 mm, the distance to the adjacent optical surface is 7 mm (adjacent optical surface distance c)−0.8 mm (one-side high transfer area width a)=6.2 mm from the above definition. Thus, the aforementioned ratio is 0.8 mm/(7−0.8) mm=13% (see the table of FIG. 11). In this case, surface division was caused in the adjacent optical surface as illustrated in FIG. 13A, and favorable adjacent optical surface precision was not obtained.

In the example of FIG. 1, since the high transfer area width a (width of one of the areas 1094) is 2.0 mm, the distance d to the adjacent optical surface is 7 mm (adjacent optical surface distance c)−2.0 mm (high transfer area width a)=5.0 mm from the above definition. Thus, the aforementioned ratio is 2.0 mm/(7−2.0) mm=40% (see the table of FIG. 11). In this case, no surface division was caused in the adjacent optical surface as illustrated in FIG. 1, and the adjacent optical surface precision was favorable.

In the example of FIG. 13B, since the high transfer area width a (width of one of the areas 1094) is 3 mm, the distance d to the adjacent optical surface is 7 mm (adjacent optical surface distance c)−3.0 mm=4.0 mm from the above definition. Thus, the aforementioned ratio is 3 mm/(7−3) mm=75% (see the table of FIG. 11). In this case, no surface division was caused in the adjacent optical surface as illustrated in FIG. 13B, and the adjacent optical surface precision was favorable.

According to the evaluation results illustrated in FIG. 11, for example, if the high transfer area width a is small with respect to the distance d to the adjacent optical surface (e.g., the area 1094 in FIG. 13A), the sink forming area becomes relatively large. Accordingly, it is not possible to suppress the effect of surface division on the optical surface. Meanwhile, if the sink area width b is small with respect to the distance d to the adjacent optical surface (e.g., the area 1095 in FIG. 13B), shrinkage in a required size cannot be formed by means of the rear surface of the movable rear surface core alone. As a result, shrinkage is caused on any of surfaces including the optical surface opposite to the sink forming area. From the results of the experiment, the ratio of (high transfer area width a)/(distance d to the adjacent optical surface) is desirably 15 to 60%.

<Effect>

In the method for manufacturing an optical element in this embodiment, an optical element is molded under the molding conditions of low injection pressure by using an injection mold that includes a movable rear surface core, on the rear surface area of which are formed a sink forming area having a first surface roughness, and a high transfer area having a second surface roughness larger than the first surface roughness and located outside the sink forming area (between the sink forming area and the optical surface formed adjacent to the sink forming area). In this manner, the optical element with good birefringence distribution and optical surface precision can be obtained. Thus, it is possible to stably provide an optical element with good birefringence distribution, which does not cause transfer defects such as surface division and sink marks on the required optical surface, without complicating the structure of the mold.

Further, an optical element is molded under the molding conditions of low injection pressure by using a mold that satisfies the above conditions on the first thermal conductivity in the sink forming area in the rear surface area of the movable rear surface core, and the second thermal conductivity in the high transfer area arranged outside of the sink forming area, in addition to the conditions of the first and second surface roughness. Thus, it is possible to obtain the optical element with good birefringence distribution and optical surface precision without complicating the structure of the mold.

[Modifications of the Lens]

In the following, the effect in the application of the present invention is verified by changing the shape of the lens to be molded. FIG. 20 is a diagram illustrating the evaluation of optical surfaces of lenses (described later) illustrated in FIGS. 15 to 19.

<Example of a Case where the Sink Forming Area is Formed in Only the Center of the Rear Surface>

In this example, as illustrated in FIG. 15, a sink forming area (sink forming surface) 1595 is formed only in the center of the rear surface of a movable rear surface core 1502A. A sink forming area 1595A is surrounded by a surface adjacent to the optical surface (hereinafter referred to as "optical surface adjacent surface"). The surface roughness Ra of the sink forming area 1595 is less than 0.5 μm, and the surface roughness Ra of an optical surface adjacent surface 1594 is 0.5 μm or more.

Evaluation was made as to the presence or absence of sink marks by external observation of the optical surface adjacent surface (first evaluation), the presence or absence of surface division by a white light interferometer (second evaluation), the presence or absence of sink marks by external observation of the optical surface not adjacent to the sink forming area 1595 (third evaluation), and whether both birefringence and surface precision could be achieved (fourth evaluation). In the following examples, evaluation was performed in the same manner as described above.

As illustrated in FIG. 20, in this example, favorable results were observed in the first to fourth evaluations.

<Example of a Case where the Optical Element has a Circular Shape>

In this example, as illustrated in FIG. 16, the optical element has a circular shape. The circular sink forming area 1595 (sink forming surface) is formed in only the center of the rear surface of a movable rear surface core 1502B, and a circular optical surface adjacent surface is formed around it. The surface roughness Ra of the sink forming area 1595 is less than 0.5 µm. The surface roughness Ra of the optical surface adjacent surface 1594 is 0.5 µm or more.

As illustrated in FIG. 20, in this example, favorable results were observed in the first to fourth evaluations.

<Example of a Case of a Long Lens>

In this example, as illustrated in FIG. 17A, a long lens is used, and the arrangement of the optical surface is different from those described in the above examples. In other words, the rear surface of a movable rear surface core 1502C and the surface facing it are optical surfaces, and two surfaces 1693C adjacent to the rear surface of the movable rear surface core 1502C are non-optical surfaces. As illustrated in FIG. 17C, a sink forming area 1695 is formed in the non-optical surface 1693C, and an optical surface adjacent surface 1694 is formed around it. The surface roughness Ra of the sink forming area 1695 is less than 0.5 µm. The surface roughness Ra of the optical surface adjacent surface 1694 is 0.5 µm or more.

As illustrated in FIG. 20, in this example, favorable results were observed in the first to fourth evaluations.

<Example of a Case of an Imaging Lens>

In this example, an imaging lens is used. In FIG. 18, a portion (area) indicated by broken lines is a high transfer area 1794, while a portion (area) indicated by thick solid lines is a sink forming area 1795. As a result of the evaluation, no surface division occurred on the optical surface, sink marks could be concentrated in the sink forming area, and molding was enabled with the stable lens outer dimensions. As illustrated in FIG. 20, in this example, favorable results were observed in the first to fourth evaluations.

<Example of a Case of a Light Guide Plate for a Head-Mounted Display>

This example illustrates an example of a light guide plate for a head-mounted display. As illustrated in FIG. 19, no surface division occurred on optical surfaces 21a and 21b, and sink marks could be concentrated in a sink forming area 1895. As illustrated in FIG. 20, in this example, favorable results were observed in the first to fourth evaluations.

EXPLANATION OF SYMBOLS

1090A Optical element
1090B Optical element
1090C Optical element
1091 Optical surface
1092 Optical surface
1093A Non-optical surface
1093B Non-optical surface
1093C Non-optical surface
1094 High transfer area
1095 Low transfer area (sink forming area)
1097 Ceramic layer
1200 Part of injection mold
1300 Movable mold core insert
1301 Movable mirror core
1302A Movable rear surface core
1302B Movable rear surface core
1302C Movable rear surface core
1310 Fixed mold core insert
1320 Push pin
1330 Recess (cavity)

What is claimed is:

1. A method for manufacturing an optical element having an optical surface and a non-optical surface that is adjacent to the optical surface via a ridge by injection molding, the method comprising:
   forming the non-optical surface with a mold having a surface that includes a first area having a first surface roughness for forming a sink area, and a second area having a second surface roughness larger than the first surface roughness, the first area having a short side and a long side, the second area having a short side and a long side, and the second area being located between the first area and the optical surface,
   wherein a length of the long side of the first area is the same as a length of the long side of the second area and the long side of the first area is in contact with the long side of the second area in its entirety.

2. The method according to claim 1, wherein
   the first surface roughness of the first area is not less than Ra 0.1 nm and less than Ra 0.5 µm, and
   the second surface roughness of the second area is not less than Ra 0.5 µm and not more than Ra 100 µm.

3. The method according to claim 1, wherein difference between the first surface roughness of the first area and the second surface roughness of the second area is not less than Ra 0.3 µm and less than Ra 100 µm.

4. The method according to claim 1, wherein
   a surface of the mold where the first area is formed is made of a material having a first thermal conductivity, and
   a surface of the mold where the second area is formed is made of a material having a second thermal conductivity higher than the first thermal conductivity.

5. The method according to claim 4, wherein
   the first thermal conductivity is not less than 0.6 W/m·K and not more than 20 W/m·K, and
   the second thermal conductivity is not less than 8 W/m·K and not more than 200 W/m·K.

6. The method according to claim 1, wherein the second area is located adjacent to a surface of the mold where the optical surface is formed.

7. The method according to claim 1, wherein a ratio of a width of the second area to a distance between optical surfaces adjacent to the non-optical surface is 15 to 60%.

8. A method for manufacturing an optical element having an optical surface and a non-optical surface that is adjacent to the optical surface via a ridge by injection molding, the method comprising:
   forming the non-optical surface with a mold having a surface that includes a first area having a first surface roughness for forming a sink area, and a second area having a second surface roughness larger than the first surface roughness, the second area being located between the first area and the optical surface,
   wherein the first area is surrounded by the second area and an entire perimeter of the first area contacts the second area.

9. The method according to claim 8, wherein
   the first surface roughness of the first area is not less than Ra 0.1 nm and less than Ra 0.5 µm, and
   the second surface roughness of the second area is not less than Ra 0.5 µm and not more than Ra 100 µm.

10. The method according to claim 8, wherein difference between the first surface roughness of the first area and the second surface roughness of the second area is not less than Ra 0.3 µm and less than Ra 100 µm.

11. The method according to claim 8, wherein
a surface of the mold where the first area is formed is made of a material having a first thermal conductivity, and
a surface of the mold where the second area is formed is made of a material having a second thermal conductivity higher than the first thermal conductivity.

12. The method according to claim 11, wherein
the first thermal conductivity is not less than 0.6 W/m·K and not more than 20 W/m·K, and
the second thermal conductivity is not less than 8 W/m·K and not more than 200 W/m·K.

13. The method according to claim 8, wherein the second area is located adjacent to a surface of the mold where the optical surface is formed.

14. The method according to claim 8, wherein a ratio of a width of the second area to a distance between optical surfaces adjacent to the non-optical surface is 15 to 60%.

* * * * *